(12) United States Patent
Beckman

(10) Patent No.: US 9,496,740 B2
(45) Date of Patent: Nov. 15, 2016

(54) TECHNIQUES FOR OPTIMIZING POWER SUPPLY OUTPUT

(71) Applicant: Chris Beckman, San Diego, CA (US)

(72) Inventor: Chris Beckman, San Diego, CA (US)

(*) Notice: Subject to any disclaimer, the term of this patent is extended or adjusted under 35 U.S.C. 154(b) by 85 days.

(21) Appl. No.: 14/306,216

(22) Filed: Jun. 16, 2014

(65) Prior Publication Data

US 2014/0368168 A1    Dec. 18, 2014

Related U.S. Application Data

(60) Provisional application No. 61/835,636, filed on Jun. 16, 2013.

(51) Int. Cl.
*H02J 7/00* (2006.01)
*G01J 1/02* (2006.01)

(52) U.S. Cl.
CPC ............ *H02J 7/0063* (2013.01); *H02J 7/0021* (2013.01); *G01J 1/0219* (2013.01)

(58) Field of Classification Search
CPC .... H02J 7/0063; H02J 7/0021; H02J 7/0016; H02J 7/0031; H02J 2007/004; Y02E 60/12; G01J 1/0219
See application file for complete search history.

(56) References Cited

U.S. PATENT DOCUMENTS

| | | | | |
|---|---|---|---|---|
| 5,767,659 A | * | 6/1998 | Farley | H01M 10/46 320/106 |
| 7,072,194 B2 | * | 7/2006 | Nayar | H02J 7/35 363/65 |
| 7,081,737 B2 | * | 7/2006 | Liu | H01M 10/441 320/130 |
| 8,098,048 B2 | * | 1/2012 | Hoff | H02J 7/0016 320/116 |
| 8,159,184 B2 | * | 4/2012 | Emori | B60L 3/0046 307/10.1 |
| 9,007,029 B2 | * | 4/2015 | Vuorilehto | H02J 7/0016 320/122 |
| 2010/0052614 A1 | * | 3/2010 | Mariels | H02J 7/0016 320/116 |
| 2011/0166720 A1 | * | 7/2011 | Su | H02H 3/40 700/292 |
| 2011/0234170 A1 | * | 9/2011 | Zhang | H02J 7/0016 320/134 |
| 2012/0293129 A1 | * | 11/2012 | Naghshtabrizi | H02J 7/0016 320/118 |
| 2013/0056614 A1 | * | 3/2013 | Balachandreswaran | G01J 1/0219 250/203.4 |

* cited by examiner

*Primary Examiner* — Michael Zarroli

(57) ABSTRACT

New power output control systems are provided that maintain optimal voltage, current, and other electrical characteristics. In some aspects of the invention, a lagging or deteriorated power supply aspect is at least partially replaced to avoid limitations while the output of a specialized, stronger aspect is altered and addressed to supply the resulting power, voltage, current charge or other gap.

19 Claims, 19 Drawing Sheets

TECHNIQUES FOR OPTIMIZING POWER SUPPLY OUTPUT

CROSS-REFERENCE TO RELATED APPLICATION

This application claims the benefit of U.S. Provisional Application No. 61/835,636, filed Jun. 16, 2013.

FIELD OF THE INVENTION

The present invention relates to the field of power supply control and optimization.

BACKGROUND

Electrochemical batteries ("batteries"), which provide a stable, continuous electrical current to a circuit from a chemical energy source, have been in use at least since the early 1800s, when Alessandro Volta invented the voltaic pile. In a battery, internal chemical reactions (such as an oxidation/reduction reaction) drive or liberate electrons (and, therefore, a negative net charge) at an electrical contact called an anode, and a positive charge to another electrical contact called a cathode. By bridging the anode and cathode with an electrical conductor, a circuit is formed, which may include an appliance, and electrical current flows from cathode to the anode, powering such an appliance. Unless and until such an electron circuit flow occurs out of the anode, the internal chemical reaction is limited due to the buildup of charged products intercalated at the anode. Typically, the potential reaction energy that is not yet occurring comprises a major part of the battery capacity, and the time that the reactions require to take place serve to smooth or "buffer" electrical energy delivery at a steady current and voltage. As the battery discharges its current, the internal chemical reaction, and the battery itself, is eventually depleted and must be replaced or recharged to maintain delivery of electrical power in the circuit.

The first rechargeable batteries were lead-acid batteries, originating in the 1850s. By passing an electrical current in the direction opposing its discharge current, some of the current-producing chemical reaction is reversed (and the charged state of the battery is restored) in a rechargeable battery. To this day, rechargeable batteries face difficult challenges and are thought by many to be a relatively impractical power source for certain applications requiring high-power and high-energy-capacity. Among other challenges, each type of rechargeable battery has its own unique discharge and optimal recharging profile (a "charging curve"), requiring specialized hardware to control, and requiring significant time to carry out. Further complicating the issues, due to manufacturing inconsistencies, each individual battery of the same type has its own unique characteristics, including capacity, voltage, internal resistance and other differences from other individual batteries—even in the same production run. In larger-scale applications of rechargeable battery cells or other units (as in electric or hybrid vehicles, where arrays of cells or modules may be implemented), manufacturers may seek to test battery units and group those with very similar characteristics, to avoid or limit mismatches that might lead batteries to become out of sync with one another in terms of charge state or capacity over several charge cycles. But some mismatch still occurs despite these efforts, and sub-optimal charging and discharging results, for at least some units. If sub-optimal discharge or charging takes place, such as overcharging or overdischarging cells beyond their ideal levels, a significant amount of power may be lost as waste energy, and injury may occur to the battery, appliance and bystanders. See, e.g., Consumer Product Safety Commission, PC Notebook Computer Batteries Recalled Due to Fire and Burn Hazard, Recalls Release No. 09-035 (Oct. 30, 2008), available at http://www.cpsc.gov/en/Recalls/2009/PC-Notebook-Computer-Batteries-Recalled-Due-to-Fire-and-Burn-Hazard/. Virtually all mainstream battery labels in everyday households instruct laymen on how to avoid the risks of explosion and leakage from common misuse, such as placing the battery into an appliance backwards. See, e.g., Proctor & Gamble, Duracell Duralock 1.5 Volt AA Alkaline Battery Product Label (EXP 2022). The most effective batteries in terms of capacity, weight burden and discharge profile are often the most dangerous in the event of misuse, perhaps due to their less tested, limits-pushing technology. For example, the danger of fire is presently greater for much lighter and more capacious Lithium Polymer and Lithium polymer/ion hybrid batteries than for their older Lithium ion counterparts.

Even where catastrophic events do not occur, mismatched batteries placed together in parallel or series arrays may lead to sub-optimal performance. For example, when a battery with much higher capacity and charge is paired with a battery of low capacity and charge in series, the weaker battery may greatly limit the voltage and current of the array. When placed in parallel, such mismatched batteries, if sufficiently unbalanced, may lead to the stronger battery (or batteries) recharging the weaker battery.

Approaches to address the effects of charge imbalances have included many active charge-level management systems, several of which operate on a cell-by-cell basis. In some instances, such systems discharge cells that are relatively overcharged, or selectively continue to charge cells that are undercharged, or otherwise individually charge each cell to an appropriate level, in an effort to achieve a similar state of all cells. See, e.g., U.S. Pat. No. 5,617,004, to Kaneko, U.S. Pat. No. 7,598,706, to Koski and Lindquist, and U.S. Pat. No. 8,143,852, to Murao.

In some instances, external batteries, capacitors and switches, among other hardware, may assist such systems in redistributing the charged states of the individual cells. Cells with higher voltage are sometimes used to charge lower voltage cells. See, e.g., U.S. Pat. No. 5,900,716, to Collar et al. Some such systems are bi-directional, to exploit at least some common structures in charging and discharging functions, and decrease auxiliary wiring and structural manufacturing costs. See, e.g., U.S. Pat. No. 5,656,915, to Eaves. Some approaches also include cell bypass modules, to isolate a cell for recharging or remove a damaged cell from a series. See, e.g., id., U.S. Pat. No. 5,897,973, to Stephenson and Palmore. Additionally, some systems attempt to ameliorate waste due to the discharge of high cells (if applicable to the balancing approach) by applying greater loads to those cells. See U.S. patent application Ser. No. 10/900,502, Publication No. 20060022639A1, to Moore.

It should be understood that the disclosures in this application related to the background of the invention, in, but not limited to this section titled "Background," do not necessarily set forth prior art or other known aspects exclusively, and may instead include art that was invented concurrently or after the present invention and conception, and details of the inventor's own discoveries and work and work results.

SUMMARY OF THE INVENTION

New battery types and power management techniques are provided. In some aspects of the invention, a computer hardware and software control system substantially maintains voltages, current and/or other characteristic(s) and capability(ies) for operating a circuit, and uses the full capacity of each battery cell and/or module, while avoiding inefficient cell-to-cell recharging to maintain cell balance. In some embodiments, a computer hardware and software control system assesses (using testing, sensing or other reacting hardware) whether a power storage or supply requires at least partial replacement and, if so, actuates hardware to increase electrical characteristic(s) and/or capability(ies) of at least one specialized, adjustable cell or cell module with adjustable characteristics to provide "gap-filling" electrical characteristic(s) or capability(ies) to the circuit, and/or at least partially bypass the power storage or supply requiring at least partial replacement.

In a preferred embodiment, cells or separable cathode, anode and/or electrolyte sections, and/or reaction regions, may be variably increased and decreased in number, reactivity, connection type (e.g., serial or parallel, or partially serial or parallel) connection periods and/or voltage and power output to alter a battery cell or cell module's inherent power delivery capabilities, in response to a control system determining that a gap exists and warrants replacement to optimize power delivery for a particular load (anticipated or present), or in response to real-time power requirements of a circuit or appliance. Such sections and regions may each be serially engaged and depleted, or engaged in response to a prior active section or region being disengaged, depleted or detected to be in a critical condition. The status of such engagement, depletion or critical conditions may be recorded, communicated and displayed to aid in battery management. In some aspects, a power supply Requirements Profile, which may include a level or pattern of required power, voltage, resistance, current, or other electrical characteristics required for the operations of a circuit or appliance, is communicated to a battery control system which, in turn, may create and produce and deliver such levels and patterns from a battery at required times using the techniques discussed above.

In another preferred embodiment, a control system may further determine whether damaged, weak or other battery cells should be at least partially bypassed and, if so, may carry out such at least partial bypass via specialized hardware. Such bypassing hardware may comprise system-actuable connections and an auxiliary power source.

In some aspects, a battery insert with variable battery mimicking and replacement hardware is provided, and may also comprise a form factor for installation in an ordinary battery compartment. Multiple insertion points and battery (or battery cell or cell module) bypassing hardware and replacement indicators may also be included. In other aspects, such variable battery mimicking and replacement hardware may be present within the battery housing itself, without interfering with the standard size or form factor for installation in an ordinary battery compartment.

In some embodiments, a control system may detect and address an overall gap in characteristics or capabilities delivered from a battery cell array, in comparison to expected or desired levels which may corresponding with integers of a particular cell type under various load conditions, and may so address that gap in tested, partial increments. These embodiments eliminate overshooting due to simultaneous action by multiple adjustment systems, and distribute additional load more evenly across separately controlled cells and modules. These embodiments comprise versions where separate control systems address each cell or cell module, or where a single control system serially addresses and controls cells or modules.

In additional aspects, an external capacitor bank, additional battery and/or testing and distribution management system are used to summon, manage and optimally redistribute the increased, gap-filling characteristics or capabilities. Such external management and distribution systems may also comprise a complementarily-shaped form factor, such that they may fit into an ordinary battery pack, along with a battery(ies).

To decrease wiring requirements and manufacturing costs, specialized new power addressing and transfer techniques are also disclosed. In some aspects, electrical characteristic(s) and/or capability(ies) are exported from a cell or cell module with leading signals relevant to their treatment by destination cell(s) or cell modul(es). For example, such leading signals may identify the destination cell for such characteristic(s) and/or capability(ies) and may dictate whether a cell relays, stores or otherwise treats such characteristic(s) and/or capability(ies) upon receiving them. In a preferred embodiment, such characteristic(s) and/or capability(ies) with leading signals are exported and transferred from one cell or cell module to others during a pulse cycle, during which ordinary load-meeting operation of the cell is arrested. To offset the resulting dip in operating current and voltage, a control system may increase the provision of ordinary operation power before and/or after the pulse cycle, and power-smoothing hardware may also aid in maintaining and delivering constant power for normal circuit operations.

In addition to electrical systems, the aspects of the invention may be applied to other forms of energy storage, transport and utilization, with specialized hardware for that purpose. For example, in an embodiment involving electromagnetic energy delivery, increased or otherwise altered electromagnetic characteristics and capabilities may be created and transmitted to varying selected points, and in varying amounts, in an electromagnetic power delivery system, rather than in an electrical circuit. A variable-length, switchable fiber-optic run may serve to so increase, compound, alter and/or redistribute electromagnetic energy for delivery, for example, by time-shifting and recombining electromagnetic energy originating at different times, and from different sources. Such variable transmission runs and time-shifting may also permit supplementing power gaps from weak sources, with power from stronger sources, aiding in balancing power sources, just as with electrical batteries as power sources.

In other aspects, the system may include selectable, rearrangeable arrays of cells and may measure several individual cell voltages, resistances and other characteristics to "hot swap" cells and create new series to normalize and dial-in series voltages to substantially ideal levels. Battery cell simulators may also be placed in selectable power output array(s), with or without battery cells, which arrays may be variable in number, order, connection and power output and bypass levels. In some embodiments, such selectable power output array(s) are dedicated to delivering final, output power from a power pack, of the nature needed for a particular load, and a control system may monitor and control both the load requirements and output characteristics of the array.

In other aspects, a simplified trickle charging subsystem is included within the profile of a battery cell, which aids in safely restoring the cell's health and state-of-charge during downtime. In some embodiments, the trickle charging subsystem is powered by ambient energy sources and motion.

This aspect is ideal for low-load, intermittently-used applications, such as hand-held remote controls and flashlights.

A new form of universal battery is also disclosed, with variable space-filling aspects and a central battery core with improved, flexibly-applied contacts.

Canons of Construction and Definitions

Where any term is set forth in a sentence, clause or statement ("statement"), each possible meaning, significance and/or sense of any term used in this application should be read as if separately, conjunctively and/or alternatively set forth in additional statements, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

"Electrical characteristic," in addition to its ordinary meaning and special meaning in the art to which it pertains, means the voltage, current, resistance, power output, or other aspect of or factor of (or affecting or potentially affecting) an electrical circuit, battery or other electrical component, device or method, or a capability of such an electrical circuit, battery or other electrical component, device or method.

"Electrical capability," in addition to its ordinary meaning and special meaning in the art to which it pertains, means the ability of an electrical circuit, battery or other electrical component, device, system or method with respect to storing, providing and/or delivering electricity. The ability of such a circuit, battery, component, device, system or method to supply power, total power, sustained voltage, sustained current, voltage over time, total work, total energy, charge, or its stored potential power and the resistance and capacity of its hardware each are expressly included as electrical capabilities, without limitation. Such capabilities include some factors and aspects beyond those electrical characteristics that may vary over time by the conventional operation of a battery in a circuit. For example, a battery may increase its inherent electrical capabilities by activating different electrolyte and/or electrode sections within a common cell housing, and reordering them in series or parallel circuits within a battery, or may create a "virtual voltage" differing from the potential of the materials used in the battery by activation of such sections for limited time, or with limited conduction.

DETAILED DESCRIPTION OF THE INVENTION

Figure 1:
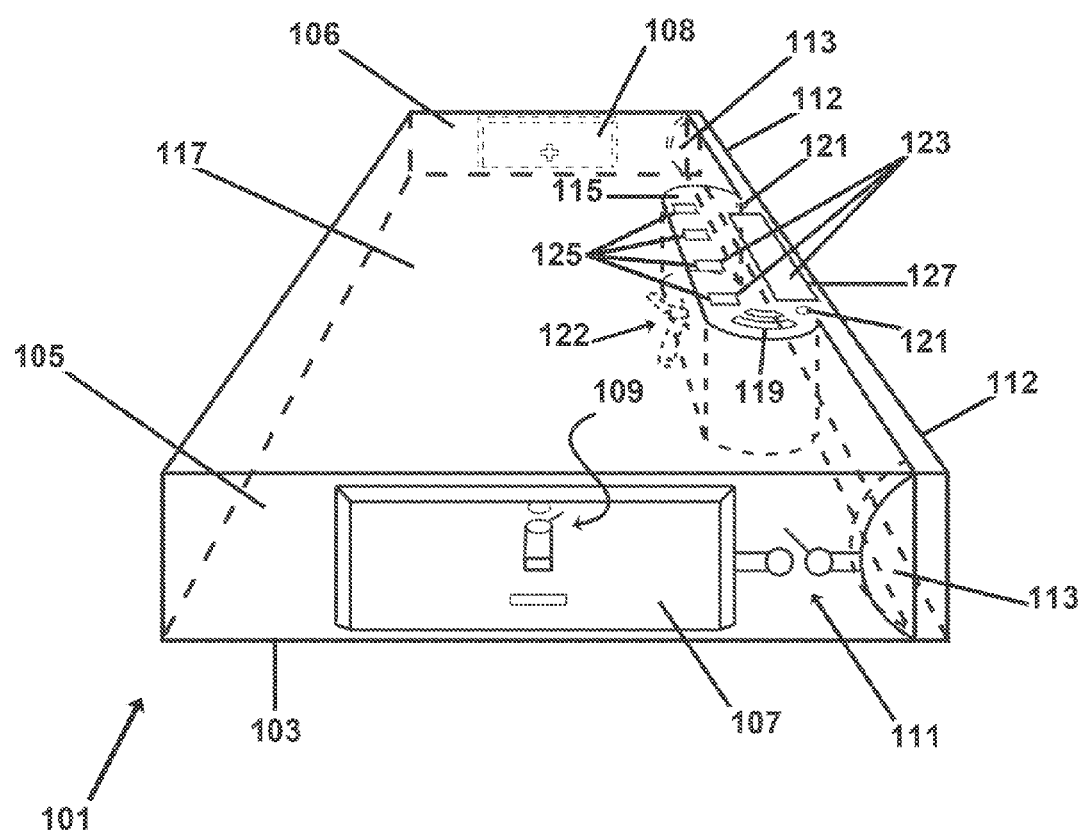
FIG. 1 is a perspective view of an exemplary specialized battery cell, comprising an electrical characteristics- and delivery-adjustable system, in accordance with aspects of the present invention.

FIG. 1 is a perspective view of an exemplary specialized battery cell 101, comprising an electrical characteristics and delivery-adjusting system, in accordance with aspects of the present invention. The outer housing 103 of cell 101 is generally a rectangular box with narrowest sides 105 and 106, each of which incorporates an electrical terminal contact 107 and 108, respectively. Negative electrical terminal contact 107 (closest to the viewer, in the perspective of the drawing) may be variably coupled with, and therefore allow the conduction of electricity from, anode material contained within cell 101, via a system- and/or user-controllable switch 109. Another switch, 111, which also is user- or system-controllable, variably bridges electrical conduction between the negative terminal contact 107 and an electrically conductive lead 112 and auxiliary electrical conduction or communications contact/port 113 to and from a battery control system 115 and/or its control system actuable and connectable components, which the control system may, among other things, connect and disconnect from leads 112 and contact port 113 via switching hardware, such as a switchable power bus, microcontroller, transistors or conventional system-actuable electrical switches.

Among other aspects, battery control system 115 may control, for example, via switches 111 and 109, variable conduction paths for electricity, and may control the partial or otherwise conditioned or augmented transmission of electricity and other communications from or through the battery cell 101. In addition, in some aspects of the invention, control system 115 itself may act as a power source, in addition to another power source and/or as an alternative to such other power source, by, for example, supplementing or mimicking the electrical performance of a battery cell, as the system and/or user determines necessary. For example, system 115 may comprise a DC-DC converter, transformer, capacitor bank, variable-size or reaction profile electrolyte and electrode interface, an auxiliary battery, capacitor bank or other storage (such as an H.P.A.S., as discussed below), separately activated and ordered electrode sections or other electrical power, characteristics or capabilities alteration, storage and delivery hardware along with a microcontroller, or other computer or other control system. An exemplary control system is described with reference to FIG. 13, below. But control system 115 may take on a wide variety of alternative, additional forms, carried out by a wide range of possible programming, to carry out the various aspects of the invention described in this application.

Control system 115 is housed in a section within cell 101 with a space-optimized shape and configuration, to allow an optimal distribution of necessary control system components, while ceding remaining space within cell 101 to the space requirements of other battery cell components, such as, but not limited to, anode material, cathode material, wet or dry electrolyte, separator material, leads and sensors (which components are not individually pictured), within a main power storage section 117.

The contents and variable electrical pathways described herein may be housed and insulated from one another and the environment via separating and insulating housings and/or other materials. For example, control system 115 and leads 112 may be enclosed within an electrically-insulating housing material. However, that housing material preferably also comprises slats 119, or other cooling and variable pressure release aspects, which may provide convection cooling airflow or other fluid exits. Control system 115 may also include user interface ("GUI") controls 121 and display hardware 123, such as LEDs 125 and/or an LCD pixel display 127, such that a user may issue various commands to, and receive feedback from, the system, for example, to carry out the various steps described in this application for a control system and/or battery management devices and systems.

For example, and as amplified in greater detail below with reference to process flow diagrams, exemplary cell 101 may, in some configurations with neighboring cells, create and exert an electrical potential matching a nominal voltage of conventional battery, or, in a similar manner to conventional battery cells, of a voltage varying during discharge. To that end, in some additional exemplary embodiments, also discussed in greater detail below, cell 101 may also take on a function and form similar to or compatible with complementary receptacles and bays designed for existing battery cell types. In such instances, anode and cathode material connected to contacts 108 and 109 and electrolyte and other components held in main power storage section 117 may generate and deliver a voltage and charge current and internal resistance at least in part by conventional means, which may, when cell 101 is properly charged, meet or exceed the performance requirements of such battery cell types and cell 101 may be placed, for example, in series with other cells of such battery cell types (although, in other instances, cell 101 may be installed in connection with cells of its own type). Under some circumstances, however, power capabilities and other characteristics and delivery thereof by control system 115 may be introduced, increased, decreased, or otherwise varied or arrested, in instances or according to patterns and periods, for example, by use of switch 111, depending on the optimal benefit of the circuit and larger battery system of which cell 101 may be a part, which actions and benefits will be discussed in greater detail below. Although switch 111 is shown as a binary switch, it should be understood that a wide variety of alternative switches, switch arrays and conductance variation hardware may, alternatively or in addition, be used. Thus, in some control states, control system 115 may partially supply a necessary voltage from its own internal hardware, or even supply all power delivered from cell 101 from that hardware, while breaking or reducing conduction from main power storage section 117, for example, by switch 109 which, as with switch 111, may take on a wide variety of alternative switch and conductance-varying hardware forms. To facilitate providing variable power, power capabilities, voltage and other electronic characteristics and capabilities, as a supplementation or replacement of power or other capabilities or characteristics from main power storage section 117, independent electrical connections 122 to anode and cathode material within storage section 117, or within an ancillary power storage system, may be provided. Connections 122 may comprise a variable interface or profile, altering the amount or number of separately insulated sections of electrochemical reagents physically available and applied for immediate reaction and/or available overall for reaction to create electrochemical power for the system 101. For example, a control system may variably access and engage otherwise isolated sections of electrode and/or electrolyte material via switching, as discussed, for example, with reference to FIGS. 11, 14 and 15, below. Alternatively, electrical connections 122 and attached anode and cathode material may be variably extended into electrolyte material (for example, by a servo/motor or actuator controlled by system 115), increasing or decreasing its reacting profile and volume, over particular periods, creating differing conduction, virtual voltages, resistance and capacities. If system-variable electrolytic repair materials or energy are used, as discussed in greater detail below, the implementation of such repair materials may also be selectably decreased or increased to alter the electrical capabilities and characteristics of system 101, as needed to optimize power delivery to an electrical circuit of which it is a part.

Using such an auxiliary source of potential, cell 101 is able to "dial-in" a variety of differing and/or supplemental power capabilities, power, voltages or other electrical circuit characteristics or capabilities for the circuit of which it is a part, as may be variably selected by the control system 115 and/or a user. As mentioned above, control system 115 may include a system-variable DC-DC converter, transformer, capacitor bank, variable-size or reaction profile electrolyte and electrode interface, separately activating electrode and electrolyte sections or other electrical power, capabilities or characteristics alteration, storage and delivery hardware. In addition, current may run through control system 115, for example, by use of two-way, switchable leads within leads 112 (variably placing system 115 in series with the remainder of cell 101 and other elements of a larger circuit) or through other electrical connections (not pictured) which may, in some embodiments, be variably engaged with anode and cathode material within main power storage 117, in addition to varying system 115's performance and capabilities, as discussed above. As a result, control system 115 may, in a preferred embodiment, convert and "dial in" different levels of power, overall power capabilities, voltage, and other electrical characteristics and capabilities delivered from cell 101 through connections 107, 108 and/or 113, as variably selectable by the system and/or user. In addition, control system 115 may include a voltage tester, charge tester or communications hardware for assessing voltage and charge conditions of cell 101, neighboring or fellow series cells, other power sources, or a larger circuit as a whole. By assessing its own cell (cell 101, or section 117) charge state and other relevant conditions, and comparing it to that of neighboring cells, cell 101 may selectably deliver increased or decreased power, voltage, or other capabilities or characteristics, or may be bypassed or partially bypassed or share in current flowing through it, as will be explained in greater detail below, with reference to additional exemplary figures.

The specific embodiments set forth above are preferred, but not exhaustive of the many different structures, devices and methods that fall within the scope of the invention. For example, as discussed in further detail below, in some embodiments, control system 115 may also or alternatively comprise power- or other characteristics- or capabilities-conditioning, -limiting, -filtering, -protecting and other hardware which may affect a wide variety of electronic circuit and battery performance characteristics, in addition to raising and lowering characteristics and capabilities and executing bypass or partial bypass operations. In other embodiments, circuit selection and main power storage section bypassing capabilities may be more limited, or removed, while power conditioning and voltage- and power-dialing and -export capabilities may be retained, for example.

Figure 2:
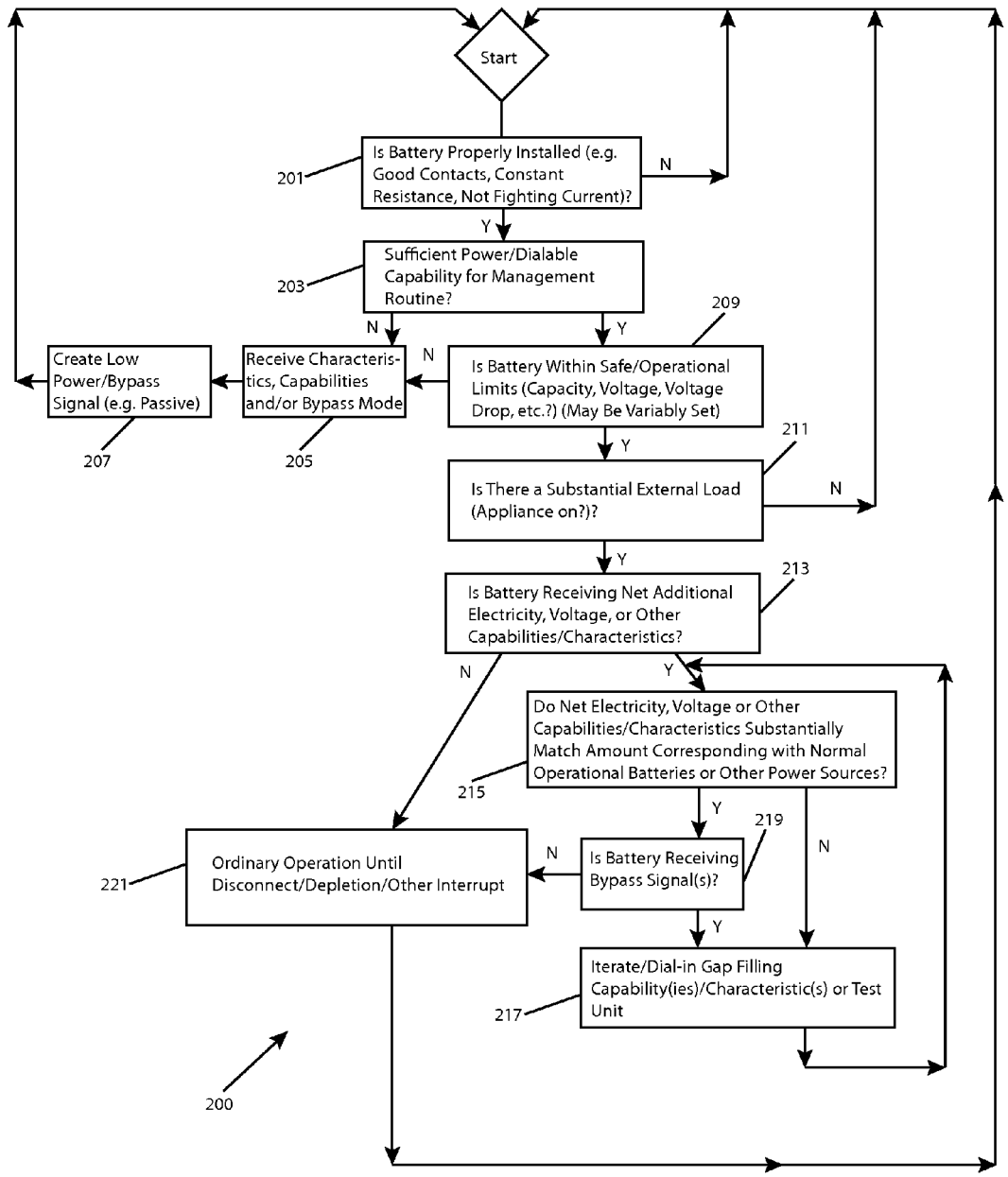
FIG. 2 is an exemplary process flow diagram of exemplary steps that may be taken by a system, such as (but not limited to) a hardware and software control system such as that discussed with reference to FIG. 13, below, implementing local monitoring and control aspects of the present invention in the context of a battery cell system, an example of which is described above, with respect to FIG. 1.

FIG. 2 is an exemplary process flow diagram of exemplary steps 200 that may be taken by a system, such as (but not limited to) a hardware and software control system such as that discussed with reference to FIG. 13, below, implementing local monitoring and control aspects of the present invention in the context of a battery cell system, an example of which is described above, with respect to FIG. 1. Beginning in step 201, the control system may determine, based on readings from sensors (such as, but not limited to, voltage and current sensors taking readings from or near the contacts 107 and/or 108 of battery cell system 101, or at other points for monitoring output and circuit current, voltage and other electrical characteristics and capabilities, or measurements relevant to such characteristics and capabilities) whether the battery cell system, of which the control system comprises a part, is properly installed to provide power to an appliance. For example, the control system may determine, based on such sensors taking continuous, limited or periodic measurements, whether the battery cell system is delivering or capable of delivering substantial charge to an external conductor that comprises at least a part of the appliance, whether the battery contacts are adequately engaged with contacts of a battery case of an appliance, and whether any neighboring or other cells or power sources installed for servicing the appliance are fighting the direction of current or charge driven from the battery cell system, whether the battery exhibits an improper resistance or resistance curve or that other conditions are affecting such sensed measurements in such a manner that improper installation may be indicated. If such improper installation may be indicated, the system may halt advancement to subsequent steps, and return to the starting position and, in some embodiments, indicate to a user that improper installation has occurred. If not, however, the system may proceed to step 203, in which it next may perform a diagnostic process to determine whether there is adequate power or other characteristics stored and available in a main cell storage (such as the main cell storage volume 117 of FIG. 1, above, and/or in an auxiliary storage volume for the system, such as within 115), or otherwise present and accessible (for example, as an imported, increased electrical capability of the cell) to carry out a Management Routine, comprising steps 209 et seq., described below. If the system determines that there is insufficient power to carry out the Management Routine, it may proceed to step 205, in which it may place the battery cell system in a mode where it is capable of receiving power from other power sources, such as neighboring cell(s), and/or in which it may bypass, partially bypass and/or charge the main cell storage area or another, auxiliary storage (for example, by actuating switches such as switches 109 and 111 of FIG. 1, above, and sending power past the main cell storage by a bypass route through leads 112 at least partially, or for limited periods of time, insulated from main storage area 117 and, in some embodiments, charging an auxiliary storage unit or H.P.A.S., as discussed below, within 115). The control system may then proceed to step 207, in which it may create and issue a signal indicating the low power, bypassed state of the battery cell system, to another control system and/or neighboring battery cell systems—for example, issuing them through contact/port 113, as discussed in FIG. 1, above. As a result of such communications, the battery cell system may begin to receive additional, dialed-in voltage, current or other electrical circuit or other electrical characteristics or capabilities from neighboring power sources and systems that receive and respond to the signal. An example of the provision of such electrical characteristics and capabilities will be discussed immediately below.

If, at step 203, the control system determined that there was, in fact, sufficient power to perform the Management Routine, it may proceed to step 209, in which it next determines, for example, from internal heat, capacity, voltage and/or other condition sensors, whether the battery cell system is operating within safe limits (which limits may be dictated by the manufacturer, user, system or may be otherwise variably programmed or set). If not, the control system may again proceed to step 205 et seq., in which it may be bypassed or partially bypassed, to safely, more slowly discharge it if, for example, the battery cell system is determined to be overcharged or overheated. In some embodiments, the control system may also determine whether the battery cell system comprises sufficient electrical characteristics and/or capabilities to substantially or sustainably assist in replacing such characteristics and/or capabilities that might be absent, and in need of replacement from other power sources, before proceeding to step 211. For example, if its own characteristics output or capabilities will become lower, or sustainable for less time (e.g., for less than the projected overall discharge cycle for all power sources in the circuit of which the cell system is a part) than that of other cells or power sources over that same time, the cell system may return to the starting position, in some embodiments, rather than proceed to step 211. In the embodiment shown in FIG. 2, however, if the battery cell system is determined to be operating within safe, operational limits in step 209, the control system may proceed to step 211, in which it next determines if the appliance in which (or for which) the battery cell system is installed is creating a substantial load (for example, being turned to an "on" position) on the battery cell system. If not, the control system may return to the starting position. (In some embodiments, step 211 may occur at an earlier stage, such as prior to step 201, may involve a periodic test for substantial load and/or may lead to another periodic delay to avoid unnecessary power expenditure.) If there is a substantial external load, however, the control system may next proceed to step 213, in which it determines whether the battery cell system and/or circuit in which it is installed is receiving substantial voltage, power, power capabilities, current, charge and/or other electrical characteristics or capabilities from neighboring cells, or other participating power source(s). If so, the control system may next proceed to step 215, in which it assesses whether the amount of circuit contribution and other electrical characteristics and capabilities that it is receiving or sensing substantially match an amount(s) for such factors corresponding with the normal, expected or correct operation of such other cells or power sources. In not, the control system may proceed to step 217, in which it may utilize its transformer, DC-DC converter, buck-booster, variable-profile electrochemical leads, variably-engageable or switchable electrode and electrolyte material sections, or other characteristic- or capabilities-dialing or other characteristics provision, conversion and contribution level alteration hardware (examples of which are discussed, for instance, with reference to FIGS. 1, 4, 6, 11, 12, 14 and 15) to add (or, in some embodiments or under some conditions, subtract) an incremental amount (or amounts) toward filling the detected "gap." Such electrical characteristics or capabilities "gaps" so addressed by the system may include the difference between the sensed or detected circuit contribution or electrical characteristics or capabilities amount(s) and such amount(s) occurring during normal, correct operation of such cells and other power sources or of the types of cells or other power sources present in the circuit, or other expected, correct or required amount(s), to achieve the next higher (or, in some embodiments, lower) amount corresponding with normal, expected, or correct operation of such cells or other power sources. The control system may iterate successive additional units of additional characteristics and capabilities, and measure such a "gap" several successive times, to account for potential additional participation of other cells also addressing the gap, as well as the affect of its own provision of characteristics and/or capabilities, until the gap is substantially filled by any and all participating cells. Capabilities gaps, if detected and addressed in the system embodiment, may be addressed by delivering gap-filling characteristics to an auxiliary storage (or H.P.A.S.) for example, within another control system 115 within the lagging cell, for deployment by that control system. In some embodiments, the amount of characteristics so delivered will be an amount projected to be sufficient to cover a projected gap, projected to occur over the charge cycle of the cell (or entire group of cells within the circuit) which projected amount may be periodically adjusted and during discharge, potentially leading to the additional transfer of such characteristics and/or capabilities. In some other embodiments, at step 217, the control system may determine the degree, or number of iterations to conduct, depending on the sufficiency of the cell's characteristics and capabilities to conduct at least some of its own ongoing operations for a projected amount of time—such as its own output of characteristics for supplying a load. In some embodiments, control systems of multiple cells may communicate or otherwise determine the cell (or cells or cell modules) with the greatest electrical characteristics and capabilities needed for gap-filling among all of the cells in a common system, and direct just that (or those cells) to supply electrical characteristics, optionally, until such a cell (or cells) no longer are the cell (or cells) with such greatest characteristics or capabilities for gap-filling replacement. If at step 215, the control system does not perceive any electrical characteristics and capabilities gap to fill, it may nonetheless proceed to step 219, in which it further determines whether a neighboring, participating cell or other power source in series with the battery cell system is issuing a new bypass or other signal, such as the signals discussed with reference to step 207, above. If so, even though no "gap" is detected, the cell may proceed to step 217, and perform the same iterative process, upward, to fill the missing electrical characteristics and/or capabilities of the bypassed cell. If no gap and no such signal are detected, however, the control system may proceed to step 221, in which it simply applies power from the main cell storage area to the circuit, in normal operation of the battery cell system, until a substantial depletion, disconnection or other interrupt event (such as a condition potentially hindering the safe, effective further operation of the battery cell system).

The exemplary process flow provided in this figure is not exhaustive of the numerous alternative embodiments that fall within the scope of the invention. For example, in some alternative embodiments, battery cell systems may further communicate with one another the amount of additional voltage or other characteristics that each is supplying and their internal battery cell status, with unique identifiers for each such increment of contribution, such that each cell may provide a share that is evenly distributed, or more distributed from stronger cells. In some embodiments, the system (and any other systems present in the circuit) delay gap-filling actions for an initial period (upon detecting a substantial load) to prevent gap-filling errors resulting from normal gaps in characteristics and capabilities within a circuit upon starting up. In still other embodiments, a count of cells or initial power sources within the circuit may be made, and expected characteristics and capabilities contribution levels for such cells and power sources may be assessed and/or recorded by the system, or the amount of contribution and gap-filling by each such system may be separately, identifiably communicated to each other such control system (of the same nature as the control system carrying out steps 200), to further prevent errors in the over-provision or under-provision of characteristics and capabilities. For example, if overall contribution levels are slightly greater than the initial, normal, nominal or otherwise correct or expected amounts from such cells and other power sources, the control systems may avoid iterating upward to fill a perceived gap, which would otherwise result in an amount greater than the expected or correct amount. Preferably, under such circumstances, a cell that has transformed or converted its characteristics output would then reduce its characteristics, to reduce the positive gap (difference) which overshot the expected, correct amount for the power sources present in the circuit. If no such overshooting has taken place, at least one cell (and preferably, the cell with the lowest state of charge or other signs of deterioration sensed by the control system) may use its electrical power, capabilities or characteristics alteration hardware to lower the output of its voltage, or other electrical characteristics. Such hardware can also be used with reverse, charging current, to increase the state of charge of such a cell and, if the circuit is functioning to deliver power during charging, such a cell may be bypassed or otherwise isolated from the circuit during such charge balancing, or other charging operations. In fact, any and all cells may employ the electrical power, capabilities or characteristics alteration hardware to facilitate charging and charge balancing (such as may be conducted in an ordinary recharging cycle from a power source outside the discharge circuit).

Other examples of alternative embodiments will discussed in greater detail, below.

Figure 3:
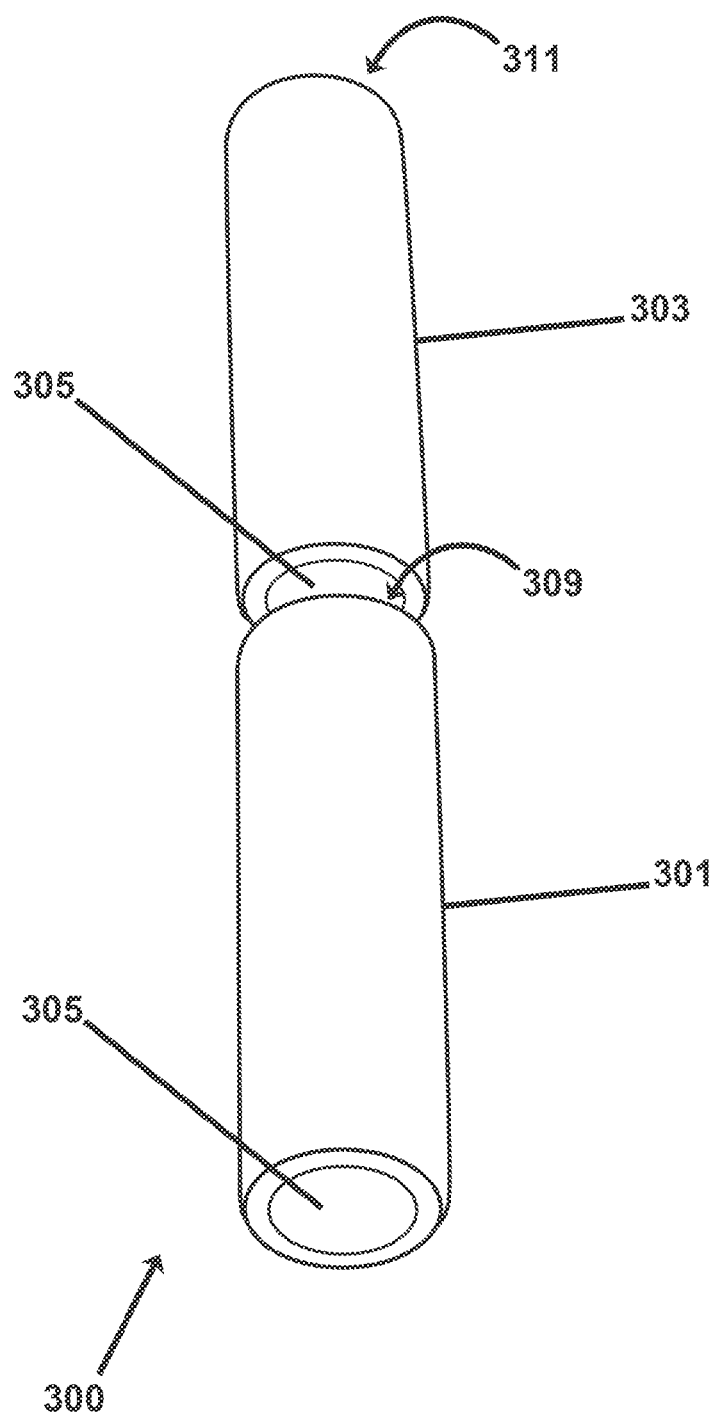
FIG. 3 is a perspective drawing depicting an exemplary pair of battery cells in electrical contact with one another and placed in a series configuration for connection in series in an electrical circuit, which exemplary pair will serve as a platform for discussing further embodiments of the present invention, with reference to subsequent figures.

FIG. 3 depicts an exemplary pair 300 of battery cells, cell 301 and cell 303, in electrical contact with one another and placed in a series configuration for connection in series in an electrical circuit. This exemplary pair of cells serves as a platform for discussing further embodiments of the present invention, with reference to subsequent figures.

Each cell 301 and 303 is generally cylindrical in shape, as is the case, for example, with American National Standard Institute size C, D, AA, AAA and AAAA batteries. As with other battery cells, each cell 301 and 303 has a negative terminal—305 and 307, respectively—electrically connected to anode material and able to deliver a flow of electrons to a conductor within a circuit, under some circumstances. Each cell also comprises a positive terminal (not expressly pictured in the perspective of the figure, but which are present on the ends of the cylindrical cells opposite the negative terminals, as demonstrated by arrows 309 and 311), connected to cathode material within the cell, which is able to draw and receive a flow of electrons from a conductor placed in contact with it in a circuit, under some circumstances. As with most battery cells, cells 301 and 303 are able to deliver a relatively steady current and power to an electrical appliance, generally within manufacturing tolerances and accuracy limitations and subject to alteration during discharge and over the life of the cells. However, also as with most battery cells of the same or a similar type, cells 301 and 303 will have important differences in capacity, charge, internal resistance, and other characteristics, due to those same tolerances and limitations and ordinary variations in assembly, wear and tear, and charge or charge cycling. If rechargeable, differences in such characteristics may become much more pronounced over several charge cycles.

Figure 4:
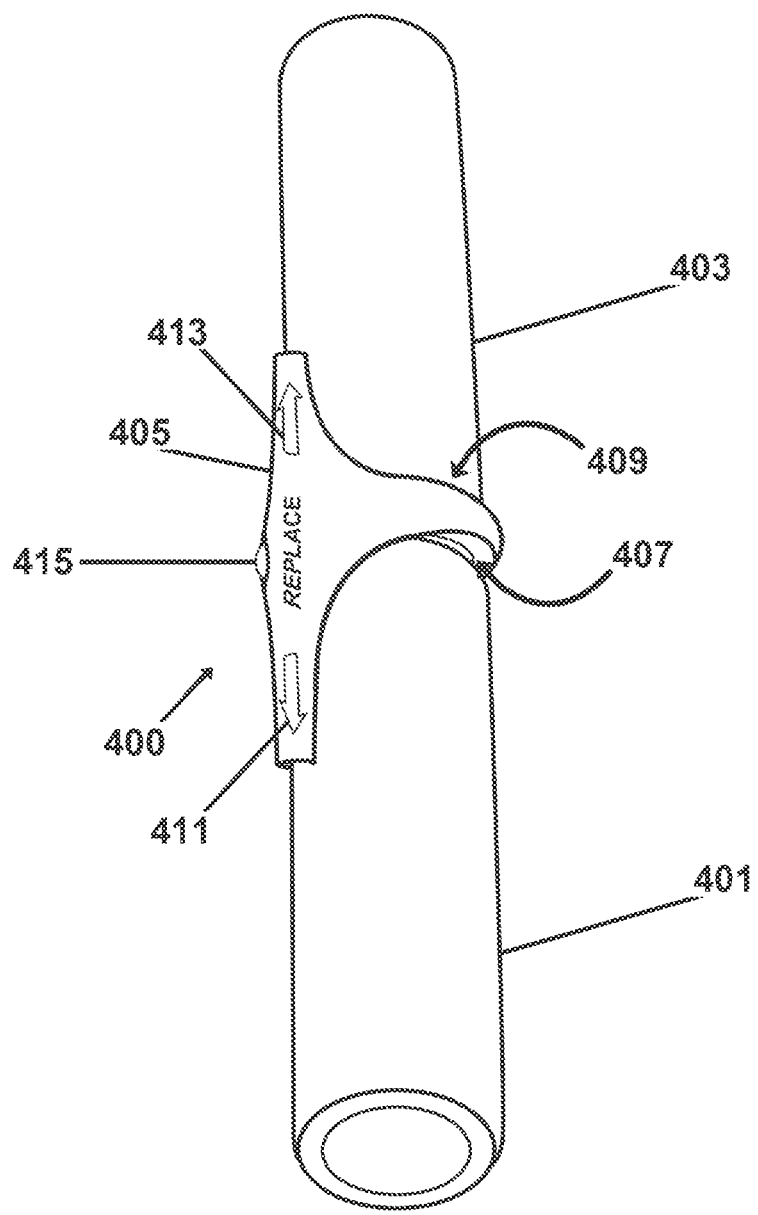
FIG. 4 depicts an exemplary variable-degree battery-substituting and circuit-optimizing insertable device system, with a complimentary form factor for installation between a pair of battery cells placed in series, as also shown in the same perspective as that provided in FIG. 3.

FIG. 4 depicts an exemplary variable-degree battery-substituting and circuit characteristics-optimizing insertable device system 400, with a complimentary form factor for installation between a pair of battery cells placed in series (401 and 403), as also shown. As with the exemplary battery cell device discussed with reference to FIGS. 1 and 2, the system 400 may comprise a control system (not separately pictured) held within a housing, 405. And, also similarly, system 400 may deliver variable auxiliary power or other electrical capabilities or characteristics to a circuit with which it is engaged, through negative and positive contacts, 407 and 409, respectively, which also may be variably connected (connected or disconnected, and so connected or disconnected to different degrees, at different times and/or for different durations) to anode and cathode material within system housing 405, as variably and continuously adjustable and/or otherwise controllable by the control system with the use of switches, or other variable activation and conduction devices, which are similarly virtually unlimited in terms of the number of possible forms. More specifically, when system 400 is properly installed between two battery cells placed in a series circuit (not all of such circuit is pictured, for simplicity) negative system contact 407 makes contact with, and allows electrical conduction with, a positive contact of one battery cell (401) while positive system contact 409 makes contact with, and allows electrical conduction with, a negative contact of another battery cell. In some alternative embodiments, however, system 400 may be inserted and installed between additional or fewer such cells, and may instead make electrical contact, at least in part, with corresponding conductive contacts of another part of an electrical circuit.

As will be explained in greater detail below, in FIG. 5, system 200 may variably, and to differing degrees, conduct electricity between cells and/or through the electrical circuit. It may also, as with the battery cell discussed in reference to FIGS. 1 and 2, include a supplementary, chargeable battery or other auxiliary power source, such as a secondary battery, capacitor or capacitor bank, among other possibilities, which may be variably applied by the control system and/or user. Also as with the control system discussed with reference to FIGS. 1 and 2, system 400 may variably supply a number of electrical circuit characteristics, depending on local readings from voltage, current and/or other electrical characteristics sensors. For example, system 400 may be variably charged, for example, using power from battery cells in connection with it, for such supplementation, and supply variable supplemental voltages, power, power capabilities, and/or other electrical capabilities or characteristics to the larger circuit of which it is a prt with the aid of a contained transformer, DC-DC converter, buck booster, coil, or other electrical characteristic converter, variable electrolyte/electrode section engagement and/or reaction and application hardware, such as, but not limited to, the electrical characteristics and capabilities adjusting hardware discussed above, in reference to FIGS. 1 and 2.

In addition, system 400 may utilize voltage, current, temperature measurements or other capacity or battery aspect (or aspect-indicating condition) communicating and/or sensing hardware to determine lagging, undercharged, failing or other critical conditions of neighboring cells and, if warranted, actuate indicators, such as directional replacement indicators 411 and 413, to alert a user that a particular cell requires replacement with a cell in a better condition. For example, in some embodiments, a user may actuate a user interface, such as that pictured as user interface button 415, which then may lead the system to determine and indicate whether such critical conditions are present in a neighboring cell installed above (such as 403, in which case indicator 413 may turn on) or below (such as 401, in which case indicator 411 may turn on), when either cell is sensed to be in such a critical condition, or in certain other condition types warranting action by a user (e.g., cell replacement). For example, in some embodiments, a signal from either cell may indicate whether it is in such a condition, and identify its location relative to the system 400. Alternatively, system 400 may detect directional voltage drops, for example, prior to and after engagement with other load(s) in the circuit, to determine the location and/or identity of the cell(s) with the condition. In other embodiments, system 400 may issue a signal keyed for erosion or other alteration by the perceived condition, at strengths that will lead to different levels of erosion depending on when the signal arrives at the cell with the condition (near or far side of the load) and, based on the degree of erosion upon arrival, deduce the identity and/or location of the cell with the condition. For example, if overheating is perceived, the direction of the overheating can be deduced by directional sensors, or a heat-affected, conducted signal may be issued and strength after passing through the load, along with a range of possible cell heats and their differing impact on signal conduction before or after passing through the load (e.g., due to the different characteristics of the signal at those different stages), may allow the system to deduce the cell's location and/or identity.

Figure 5:
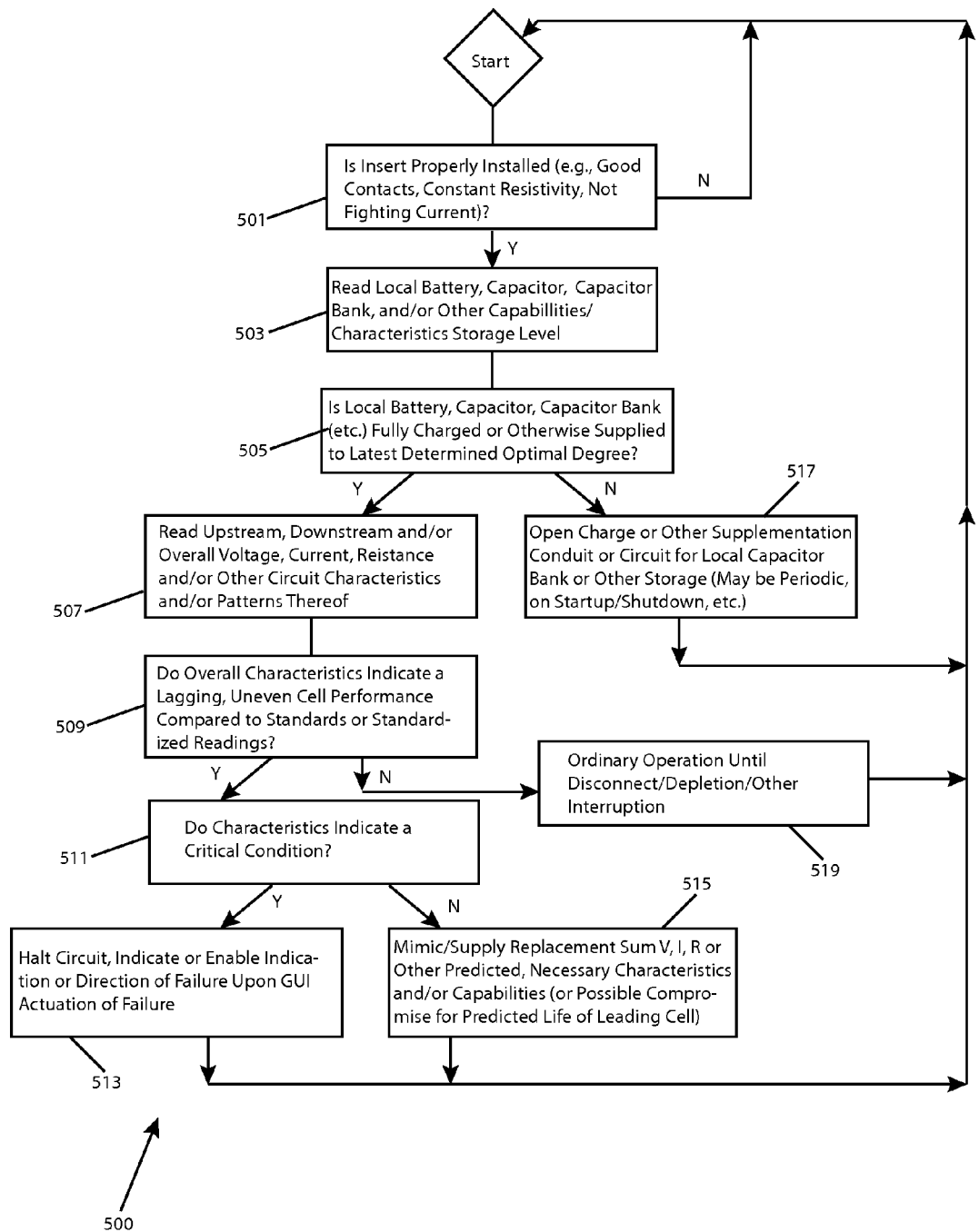
FIG. 5 is an exemplary process flow diagram of exemplary steps that may be taken by a system, such as (but not limited to) a hardware and software control system of the nature discussed with reference to FIG. 13, comprised in a battery-substituting and circuit-optimizing insertable system, such as the system discussed with reference to FIG. 4, above.

FIG. 5 is an exemplary process flow diagram of exemplary steps 500 that may be taken by a system, such as (but not limited to) a hardware and software control system of the nature discussed with reference to FIG. 13, below, comprised in a battery-mimicking and circuit-optimizing insertable system, such as the system discussed with reference to FIG. 4, above. Beginning in step 501, the control system may determine, based on readings from sensors (such as, but not limited to, voltage and current sensors taking readings from or near the contacts 407 and/or 409 of insert system 400) whether the insert system, of which the control system comprises a part, is properly installed to provide power or other electrical characteristics or capabilities to a circuit, and allow the transmission of at least some current, power or other characteristics through system 400. For example, the control system may determine, based on such sensors or physical position sensors, whether the insert system is installed properly, delivering or capable of delivering substantial charge to an external conductor that comprises at least a part of a neighboring, properly-installed battery cell, or other circuit contacts, whether such contacts are adequately engaged, and whether any neighboring or other cells or power sources installed for servicing the circuit are fighting the direction of current or charge driven from the battery cell system, in such a manner that improper installation may be indicated. If such improper installation may be indicated, the system may halt advancement to subsequent steps, and return to the starting position. If not, however, the system may proceed to step 503, in which it may read the level of auxiliary power storage or other electrical characteristics or capabilities stored, present or otherwise available for use in the system 400. The control system may then proceed, in step 505, to compare that reading (or those readings) with amounts indicating that the full charge capacity of the system's auxiliary storage has been utilized, and/or an amount of charge is present that the system has determined is optimal or necessary for its current, ongoing operation(s) supplying voltage, current and/or other characteristics and/or capabilities to the circuit in which the system is installed. If the current level of charge of the system's auxiliary storage is determined to be inadequate, the system proceeds to step 517, in which it may open a separate circuit or conduit for charging or otherwise supplementing or adjusting the system's auxiliary power or other storage, and charge, supplement or otherwise adjust it to the full or otherwise optimum level. If the current level of charge or other electrical capabilities or characteristics of the system's auxiliary storage is determined to be so adequately charged, it may proceed to step 507, in which the system may next take readings, with specialized sensors, to determine the upstream, downstream and/or overall voltage, current, resistance and/or other characteristics, or patterns thereof, of the electrical circuit in which it is installed. Next, in step 509, if such readings do not indicate a lagging, uneven performance of a cell connected and supplying power, in series with the insert system, to the circuit, the system may, in step 519, enter an ordinary operation mode, permitting the ordinary flow of current from the cell on one side of the insertable device system to the cell on the other side until either of the cells is substantially depleted of stored power, disconnected from its installed position, or until another interrupt event, such as a cell failure, lagging cell or other critical condition, is sensed by the insertable device system. If, however, the readings in step 509 do indicate a lagging, uneven performance of a cell, the system may proceed, in step 511, to determine whether a critical condition, such as a cell failure, overheating, or greatly increased resistance levels, or other conditions, substantially indicate a likely cell failure in the series circuit. If the system determines that such a cell failure or other critical condition is likely to exist, which may, for example, create an unacceptable danger in continued operation of the cells supplying the circuit, the system may proceed, in step 513, to break the circuit, and halt current through it. The system may also, at this stage, indicate (or indicate upon a user actuating a GUI or other control for indication, or otherwise triggering indication) such a critical condition and/or cell failure to a user. In addition, if upstream/downstream or other readings indicate to the system the direction or identity of a cell with such a failure or other critical condition, the system may indicate that direction or other identity of such a cell to the user (for example, through indicators 411 and/or 413, discussed above).

However, if such a failure or other critical condition is not determined to be present, the control system may proceed, in step 515 to address the lagging, uneven performance of a cell connected and supplying power, in series with the insert system, by providing ("mimicking") the missing ("gap") voltage, current, power or other electrical characteristics and/or capabilities via the auxiliary storage and delivery hardware, such as, but not limited to, a transformer, DC-DC converter, buck booster, variable resister, switches, other system-variable conduction pathways, variably-engageable electrode and electrolyte materials sections and/or other appropriate hardware controlled by the control system, examples of which are discussed elsewhere in this application. As indicated in step 515, in addition to filling such currently detected "gaps," the system may also predict likely needs of the circuit over time, and supply such necessary electrical characteristics and capabilities, while periodically continuing to update its readings and adjust such predictions, and delivered characteristics.

At this point, or if no substantially lagging or uneven cell performance is indicated in step 509, the control system may return to the starting position.

Figure 6:
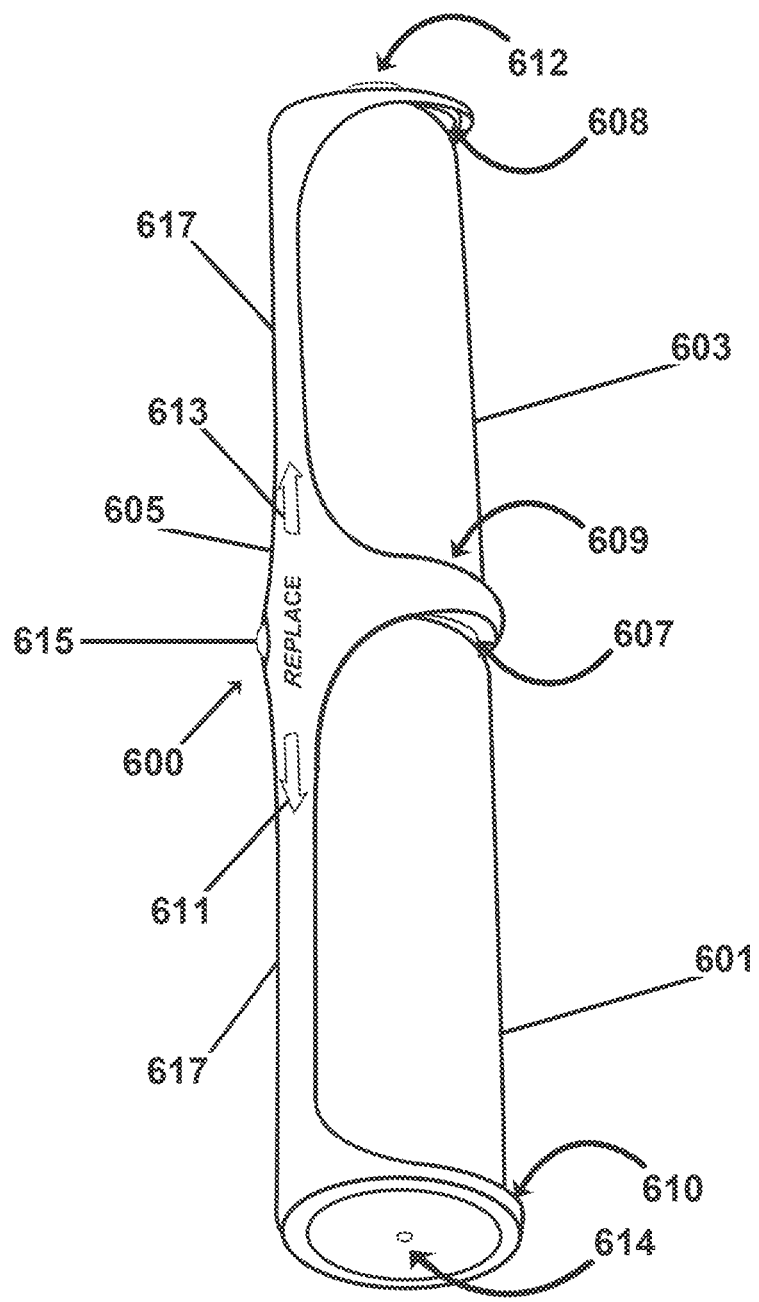
FIG. 6 depicts an exemplary variable-degree battery-substituting and circuit-optimizing insertable device system, with a complimentary form factor for installation between and around a pair of battery cells placed in series, as also shown in the same perspective as that provided in FIGS. 3 and 4.

FIG. 6 depicts an exemplary variable-degree battery-substituting and circuit-optimizing insertable/wraparound device system 600, with a complimentary form factor for installation between and around a pair of battery cells placed in series and within an appliance battery case (not pictured) designed to accept such a pair of batteries. FIG. 6 is in the same perspective as that provided in FIGS. 3 and 4. Part of the form of system 600 is similar in dimensions and suitability for insertion between, and also installation with (for example, into a battery compartment of an appliance) the pair of batteries (now 601 and 603) shown in series. However, in addition to the positive and negative contacts (now 607 and 609) installed in between cells 601 and 603, four additional negative and positive terminals, 608, 610, 612 and 614 are also provided, each of which are shown installed between the other terminals of the cells, and terminals of an appliance in which the cells and device system 600 are each installed (not pictured). Negative and positive terminals 608 and 610 (respectively) directly interface with additional positive and negative terminals of cells 601 and 603 (not visible) and, when properly installed, permit charge or current to be conducted from those cell terminals to the system 600, as do contacts 607 and 609. In addition to the capabilities set forth above, with respect to FIG. 4, the system may include switches or other variable conductance hardware, to variably permit the conduction of electrical current or other characteristics bypassing (or partially bypassing) either cell 601 or 603 if, as discussed in greater detail below, circumstances may warrant such bypassing. System 600 may also, as with the system set forth with reference to FIG. 4 above, deliver voltage, current, power, power capabilities or any other electrical characteristic or capability that the system may determine to benefit or potentially benefit the circuit—for example, by sensing circuit characteristics with various testing hardware, such as that discussed above with reference to FIGS. 4 and 5. However, in addition, owing to its additional bypassing capabilities, system 600 may also deliver any such circuit characteristics and/or capabilities at or through multiple points in the circuit, as the system may determine such points of insertion to be necessary—namely: (A) at a point in the circuit between cell 603 and conduction hardware leading from an appliance, (B) at a point in the circuit between cell 601 and conduction hardware leading to an appliance, and/or (C) at the point in between cell 601 and 603. Each of these points of insertion may be implemented with the use of contacts 607, 608, 609, 610, 612 and 614 and switching and/or other variable cell bypass hardware within system 600. More specifically, such variable bypass hardware may include switchable electrical conduction leads within arms 617 and between contacts 607 and 609, variably connecting each contact with any other contact (or any other group of contacts), and other electrical characteristics storage, management and conversion hardware, within system 600, in any grouping, order or partial grouping or order. In other words, system 600 may permit the conduction of electrical charge and/or current from or to any of the contacts, and in any order or combination. System 600 may include separate afferent and return electrical leads, or conduction pathways, which may each be individually variably switched on or off or ordered (or partially ordered) or bypassed (or partially bypassed) by a control system within system 600 to permit conduction selectably bypassing either cell, and conduction to and/or from any lead to power conversion, filtering or other conditioning and/or routing hardware within the control system, and/or to permit conduction directly to and from other contacts. An exemplary control system, again, is provided below, in reference to FIG. 13.

Figure 7:
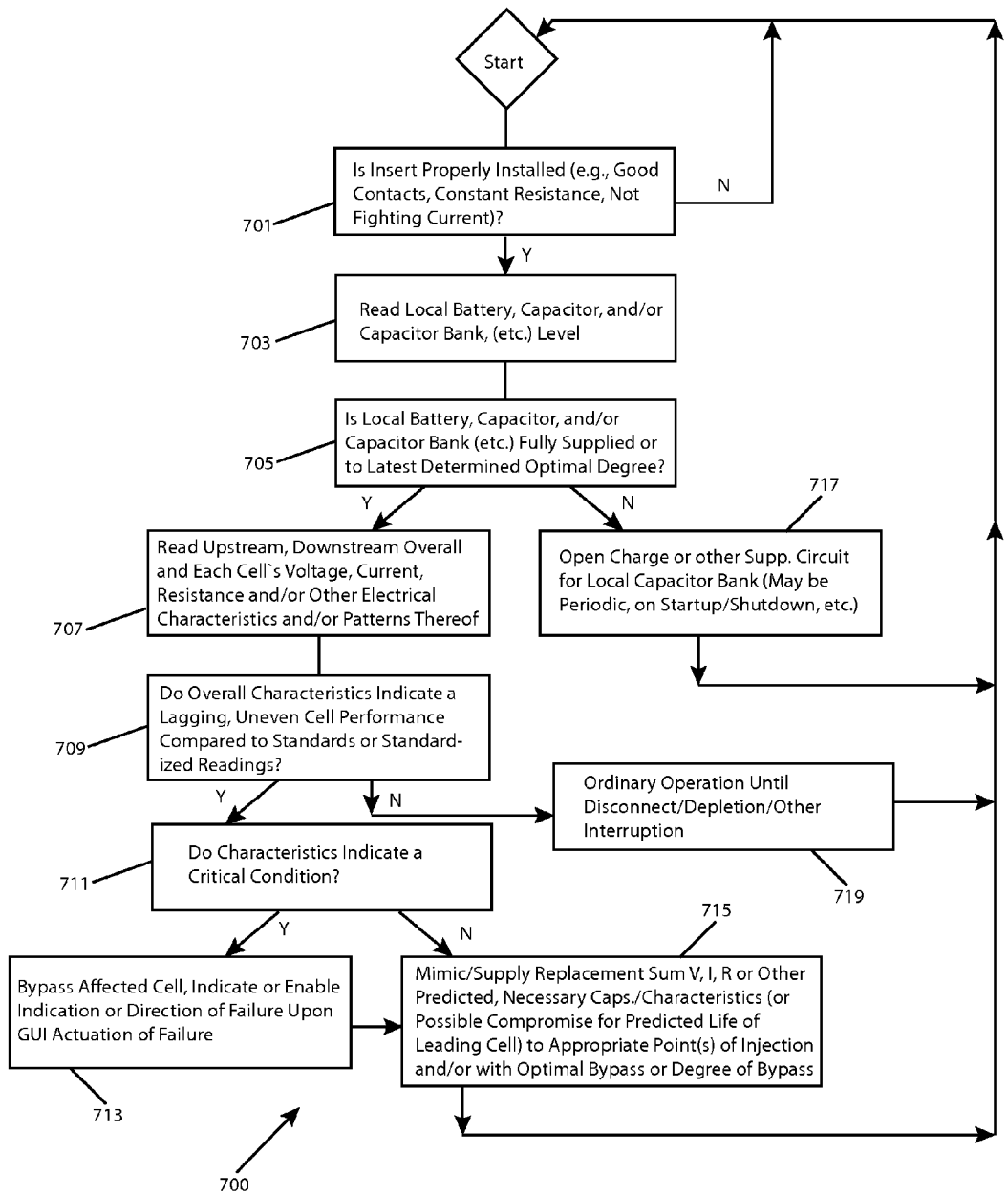
FIG. 7 is an exemplary process flow diagram of exemplary steps that may be taken by a system, such as (but not limited to) a hardware and software control system of the nature discussed with reference to FIG. X, comprised in a battery-substituting and circuit-optimizing wrap-around and insertion system, such as the system discussed with reference to FIG. 4, above.

FIG. 7 is an exemplary process flow diagram of exemplary steps 700 that may be taken by a system, such as (but not limited to) a hardware and software control system of the nature discussed with reference to FIG. 13, comprised in a battery-substituting and circuit-optimizing wrap-around and insertion system, such as the system discussed with reference to FIG. 6, above. Several, but not all, of these steps are similar in nature to those discussed with reference to FIG. 5, above. Nevertheless, the entire flow of steps is discussed again, for clarity.

Beginning in step 701, the control system may determine, based on readings from sensors (such as, but not limited to, physical sensors, voltage or current sensors taking readings from or near the contacts 607, 608, 609, 610, 612 and/or 614 of insertable/wraparound device system 600) whether the system 600, of which the control system comprises a part, or the cells held within it is/are properly installed to provide power or other circuit characteristics to a circuit, and, thus, whether to allow the transmission of at least some current through system 600. For example, the control system may determine, based on such sensors, whether the insert system is delivering or capable of delivering substantial charge to an external conductor that comprises at least a part of a neighboring, properly installed battery cell, or to other circuit contacts (such as the contacts discussed above), whether such contacts are adequately engaged, and whether any neighboring or other cells or power sources installed for servicing the circuit are fighting the direction of current or charge driven from other battery cells, the entire power delivery system (of which system 600 may be a part), or a power delivery or larger circuit, in such a manner that improper installation may be indicated. If such improper installation may be indicated, the system may halt advancement to subsequent steps, and return to the starting position. However, in some embodiments of an insert/wraparound system 600, the comprised control system may change or select the route of current from certain of the contacts to create a single, unified direction of current for all cells encompassed in the system 600, with no need for the user to reinstall the comprised cells, and with no need to return to the starting position and, in such embodiments, the control system would carry out such actions and proceed directly to step 703. In any event, if the control system proceeds to step 703, it may read the level of auxiliary power or other electrical capabilities or characteristics stored by the system 600. The control system may then proceed, in step 705, to compare that reading (or readings) with an amount of charge indicating that the full capacity of the system's auxiliary storage has been utilized, and/or an amount of charge or other characteristics or capabilities that the system has determined is optimal or necessary for its current, ongoing operation(s) supplying voltage, current and/or other capabilities or characteristics to the circuit in which the system is installed. If the current level of charge of the system's auxiliary power source is determined to be inadequate, the system proceeds to step 717, in which it may open a separate circuit for charging or supplying the system's auxiliary storage, and charge it or otherwise supply it to the full or otherwise optimum level. If the current level(s) of the system's auxiliary storage is determined to be so adequately supplied, it may proceed to step 707, in which the system may next take readings, with specialized sensors, to determine each cell's voltage, current, resistance and/or other characteristics, or patterns thereof, and such characteristics of the electrical circuit in which it is installed, and such characteristics upstream, downstream and/or overall at any point of contact insertion between cells and/or the appliance. Next, in step 709, if such readings do not indicate a lagging, uneven performance of a cell connected and supplying power, in series with the insert system, to the circuit, the system may, in step 719, enter an ordinary operation mode, permitting the normal flow of current from cell 601 to cell 603 and out to the circuit, through each pair of contacts of system 600, in which each cell is installed, until either or both of the cells is substantially depleted of stored power, disconnected from its installed position, or until another interrupt event, such as a cell failure, lagging cell or other critical condition, is sensed by system 600. If, however, the readings do indicate a lagging, uneven performance of a cell in step 709, the system may proceed, in step 711, to determine whether a critical condition, such as a cell failure, overheating, or greatly increased resistance levels, or other conditions, substantially indicate a likely cell failure or other critical condition in the series circuit. If the system determines that such a cell failure or other critical condition is likely to exist, which may create an unacceptable danger in continued operation of the cells supplying the circuit, the system may proceed, in step 713, to bypass the cell in which the condition is determine to exist, and halt current through it, while bridging current from the remaining cell around the cell with the condition, and supplying supplemental circuit characteristics, as needed, in the following step. The system may also, at this stage, indicate (or indicate upon a user actuating a GUI or other control for indication, or otherwise triggering indication) such a critical condition and/or cell failure to a user. The system may indicate that direction or other identity of such a cell to the user (for example, through indicators 611 and/or 613, discussed above).

If such a failure or other critical condition is not determined to be present, or if a cell has been bypassed, in step 713, the control system may proceed, in step 715 to sense and address lagging, uneven performance or different capacities of either cell connected and supplying power, or replace a bypassed cell's performance, in series with the system 600, by mimicking the missing ("gap") voltage, current, or other electrical characteristics or capabilities via the auxiliary stored power and power delivery hardware, such as, but not limited to, a transformer, DC-DC converter, buck booster, variable resister, switches, other system-variable conduction pathways, variably engageable electrolyte/electrode material sections or other variable engagement hardware and/or other appropriate hardware controlled by the control system. As indicated in step 715, in addition to filling such currently detected "gaps," the system may also predict likely needs of the circuit over time, based on ongoing load conditions, and the capacity of each cell, and supply such necessary electrical characteristics and/or capabilities, while periodically continuing to update its readings and adjust such predictions, and delivered characteristics.

Figure 8:
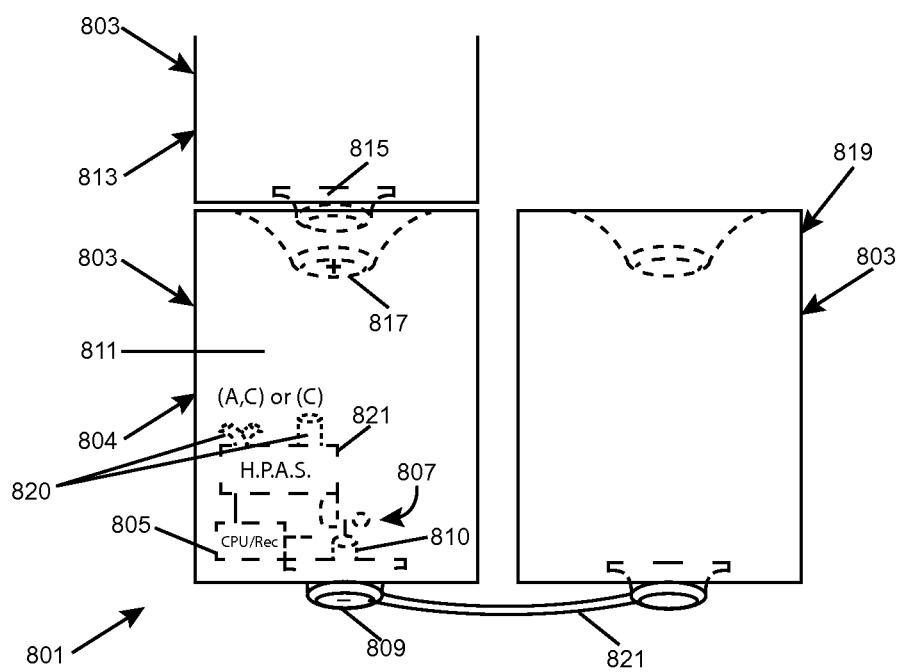
FIG. 8 is a top view of parts of an exemplary battery cell complex, comprising supplementary power addressing, sending and receiving hardware, in accordance with aspects of the present invention.

FIG. 8 is a top view of parts of an exemplary battery cell complex 801, comprising supplementary power and/or other electrical capabilities or characteristics addressing, sending and receiving hardware, in accordance with aspects of the present invention. System 801 may comprise individual battery cells 803, which may comprise various controllable hardware and at least one control system 805 (pictured within an exemplary cell 804 in the embodiment shown) for controlling that hardware. Among other things, control system 805 may variably actuate a switching or other variable conducting and/or communication selection complex 807, which may variably send power (or other characteristics or capabilities, if conductable or deliverable) and current through a multiple-use negative contact 809. Control system 805 may, under certain circumstances (examples of which are discussed in greater detail with reference to FIG. 9, below) cause conducting/communicating complex 807 to: (A) conduct charge, voltage, current or other electronic characteristics from anode material in a main cell storage section 811 through a switchable connection 810 and to a negative contact 809; (B) conduct charge, voltage, current or other electronic characteristics from a high-powered auxiliary storage ("H.P.A.S.") device 821 through the same switchable connection 810 and to negative contact 809, which also has Anode and Cathode connectors, shown as 820; (C) conduct pulses or other units comprising part of such characteristics through connection 810 and negative contact 809; and/or (D) introduce a leading electronic code through the same selectable conduction pathway(s), and away to other connected or otherwise networked cells, to dictate the further management of such characteristics or part(s) of such characteristics at intermediate or final destination points—for example, directing management by control system-managed hardware within such other cells.

Main storage area 811 may receive similar characteristics or codes from other, neighboring, electrically connected cells, such as cell 813, from its negative contact 815, and internal hardware (similar to the hardware discussed above, with reference to cell 801) and an identical or similar control system which may also be present in such neighboring cells (not separately pictured). When such characteristics or codes are so delivered, they may flow through a complementary positive contact, 817, within cell 801, coupled with and able to conduct such characteristics from negative contact 815. Depending on the placement and electrical connections joining two such neighboring cells (for example, if they are side-by-side, in a parallel circuit configuration, as may be the case with cell 801's relationship with another, parallel cell 819), a bridging contact between the communicating negative terminal of one cell and positive terminal of another cell (such as bridging contact 821) may also be used to conduct such characteristics and/or codes.

Depending on the nature of the codes and characteristics transmitted from one cell to another (which may pass through intermediate cells), the internal hardware receiving such codes or characteristics may permit such characteristics to pass through or bypass a main storage section (such as 811) or other internal hardware and on to other cells or an appliance through a negative contact, instead terminate or temporarily terminate such transmission through or bypassing the main storage section and other internal hardware and use such characteristics to charge or otherwise supply the main storage section, with the aid of its control system (such as 805) and/or H.P.A.S., or charge the H.P.A.S. itself, either of which may therefore take in at least some of the characteristic(s) stored and no longer transmitted. All of these actions may be triggered by the control system actuating timed switching of its variable conducting and/or communication selection complex (such as 807). In some embodiments, a separate conducting path (not pictured) between the negative and positive terminals of a cell, electrically separate from main storage section 811, may also be activated by switching and may transmit or retransmit such received characteristics and codes, as directed by a control system, and therefore ameliorate the effect of internal resistance on the re-transmission of externally-addressed power. To aid each system in determining which action to take (transmission or intra-cellular use), each cell may have its own unique coding, and each cell may communicate with other cells' control systems, or with a master control system, to indicate its electrical characteristics supplementation needs or capabilities, and lead other cells to produce, transmit and receive needed characteristics to achieve properly balanced series or other arrangements of cells, or the effect of the properly balanced arrangements. Upon so successfully transmitting such characteristics and codes, in response, receiving and intermediate cells then also behave as discussed above.

A more complete exemplary process flow for such a variable management and delivery of such code-addressable electrical characteristics is provided in greater detail below, in reference to FIG. 9. An exemplary control system, which may be used as control system/C.P.U./transmission unit 805 is described with reference to FIG. 13, below.

Figure 9:
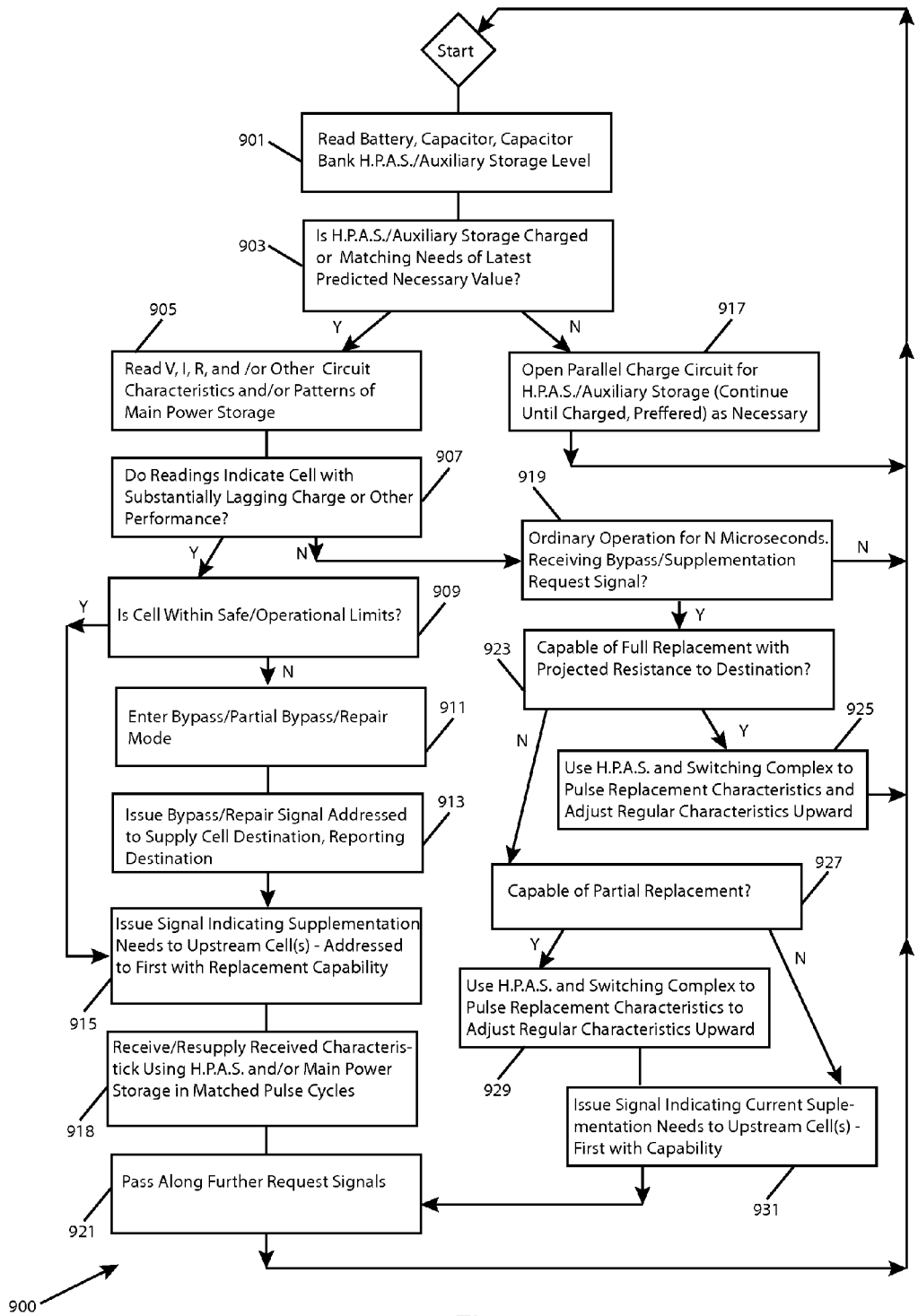
FIG. 9 is an exemplary process flow diagram of exemplary steps that may be taken by a system, such as (but not limited to) a hardware and software control system of the nature discussed with reference to FIG. 13, comprised in a battery cell complex system, such as the system discussed with reference to FIG. 8, above.

FIG. 9 is an exemplary process flow diagram of exemplary steps 900 that may be taken by a system, such as (but not limited to) a hardware and software control system of the nature discussed with reference to FIG. 13, comprised in a battery cell complex system, such as the system discussed with reference to FIG. 8, above.

Beginning with step 901, the control system may read the level of auxiliary power, voltage, charge and/or other accessible electrical characteristic(s) or capabilities stored by an auxiliary storage device within a battery cell, managed by the control system, such as an auxiliary, comprised battery, capacitor, capacitor bank, High-Powered Auxiliary Storage device or other such auxiliary power storage hardware ("H.P.A.S."). For example, the control system may take readings using voltage sensors, charge sensors and/or other sensors, to determine the storage levels within the H.P.A.S.

In a preferred embodiment, such an H.P.A.S. is able to deliver a higher voltage, higher current, or other characteristic exceeding that of a main storage section of the battery (by itself), but such levels, or a variety and/or spectrum of levels including and below such levels, may be selectively applied, and applied in timed pulses along with informational, leading, coded signals, by the system to an exiting conductor or other transmission conduit.

After taking such power level or other electrical characteristic(s) reading of the H.P.A.S., the control system may then proceed, in step 903, to compare that reading (or those readings) with an amount of charge indicating that the full capacity of the H.P.A.S. has been utilized, and/or an amount of such stored power and/or other characteristics that the system has determined is optimal or potentially necessary for its current, ongoing operation(s) supplying voltage, current and/or other circuit characteristics to the circuit in which the system is installed. Such potentially necessary operations are discussed further, in subsequent steps. If the current level of stored power and/or other characteristics of the H.P.A.S. is determined to be inadequate, the system proceeds to step 917, in which it may open a separate circuit for charging the system's H.P.A.S./auxiliary power storage, and charge it to the full or otherwise optimum level. If the current level of stored power and/or other characteristics of the H.P.A.S. is determined to be so adequate, the control system may proceed to step 905, in which the system may next take readings, with specialized sensors, to determine the voltage, current, resistance and/or other characteristics and capabilities, or patterns thereof, of the cell's main power storage (such as that discussed as 811, above). Next, in step 907, if such readings do not indicate a lagging, uneven performance of the main power storage section of the cell the system may, in step 919, enter an ordinary operation mode, permitting the ordinary flow of current from the cell main power storage section, through the positive and negative terminals (817 and 809), to a connected neighboring cell, or to the appliance in which it is installed, for a certain length of time (N), which may be variably selected or optimized for cell efficiency and efficiency of the entire power-supplying, electrically networked group of cells (or the circuit as a whole) of which the cell is a part. Following and/or concurrently with that period, the control system may assess whether it is receiving a signal (requesting action) from another cell in the networked group of cells and, if so, executes subsequent steps. For example, such signals may include "Bypass" or "Supplementation" request signals. If no such signals are received, the control system may return to the starting position.

Such signals, and the subsequent steps caused by receiving them, will be better understood by first turning to the steps that may lead to their generation. If the cell's internal main storage section readings in step 907 instead indicate a lagging, uneven performance and/or capability of the cell, the system may proceed, in step 909, to determine whether a critical condition, such as a cell failure, overheating, or greatly increased resistance levels, or other conditions, substantially indicate a likely main storage section or other problem with continued operation of the cell using main storage and certain other associated hardware. If the system determines that such a cell failure or other critical condition is likely to exist, which may create an unacceptable danger in continued operation of the cell in that way, the system may proceed, in step 911, to enter a "Bypass Mode," "Partial Bypass Mode," or other "Repair Mode," as determined to be necessary or optimal by the control system to minimize dangers and inefficiencies that would otherwise be caused by continued application of power or other characteristics from the main power storage area. In a Bypass Mode, the control system may bridge the conduction of power and/or other characteristics completely around the main storage section via a switchable conduction path, avoiding the application of power to the main storage section entirely. In a Partial Bypass Mode, the control system may so bypass external power around the main storage for a part of ongoing time, or to a partial degree. In a Repair Mode, the control system may access and apply electrical or electrochemical or other physical characteristics provided from outside of the cell, or from another internal device (such as the H.P.A.S.), to repair a perceived issued with the main storage section (such as by charging, if perceived to be dangerously undercharged, or discharging, if perceived to be dangerously overcharged, or by "zapping" it to reduce electrolyte/electrode crystallization, etc.). In any event, after entering one or more of such modes, the control system, in step 913, may proceed to issue coded or other signal(s) indicating or otherwise related to the mode entered and/or the cell condition leading to the mode entered. Such signal(s) may be coded to identify the nature of the sensed cell condition, and the identity of the cell in which they occur, as well as the nature of actions to be taken by other cells and/or hardware receiving the signals. Next, in step 915, the control system may issue another form of destination-addressed signal(s) to other, commonly networked cells, and/or other hardware, identifying, potentially causing the partial fulfillment of, or otherwise related to the supplementation needs of the cell. Preferably, such signals are sent by the control system in a direction through a positive terminal or other conductive pathway upstream of current being received by the cell, such that the nearest neighboring cell providing current or charge to the cell, with the least resistance in its pathway for sending supplemental electrical characteristics to the cell, is addressed first. If, in step 909, the control system determines that the cell is in safe operational limits, it may simply proceed directly to step 915, and the following steps.

Separate contacts for signal communication may also be used but, preferably, are not used, to reduce manufacturing costs. After receiving such signals, other networked cells may take further actions to provide at least part of the supplemental needs of the cell. The nature of such actions will be explained in greater detail below.

Following step 915, the control system may then, in step 918, receive and utilize the requested supplemental power or other electrical characteristics from the signal-addressed, neighboring cells that received and then acted on the signals sent by the cell. The control system may also pass along part of such received characteristics, if exceeding its needs, or if addressed to another networked cell, also in need of supplementation. In some embodiments, control system(s) may issue characteristics comprising higher voltage than ordinary current applied by the cells, and for instances, periods or pulses with standardized timing, or timing indicated by a leading signal, issued just before the sent characteristics, causing receiving cells to switch between ordinary power provision from main power storage through their contacts to receiving or passing along the characteristics they then receive, later returning to ordinary power transmission from their main power sections. Because the time spent receiving, applying and/or retransmitting such characteristics leads to a gap in ordinary power delivery, the control system may increase power, voltage and/or current delivery in its following ordinary power transition period(s) or cycle(s) as necessary to restore a beneficial level to a serviced appliance. In step 921, the control system may also pass along supplementation request signals from such other, networked cells. In these aspects, expensive, redundant power transmission architecture can be minimized through the common use of minimal, conductive hardware.

In more detail with respect to the receipt of signals from other similar, commonly networked cells, in step 923, the control system may, after receiving a Bypass Mode or Supplementation Request signal from another cell, assess (by the same or other sensors and other assessment hardware readings as discussed above) whether it has the internal charge state, stored power, voltage, or other characteristics necessary to supply supplemental characteristics in aid of the requested cell, as identified by the signal. If so, the control system may then, in step 925, create and/or transmit such supplemental characteristics, preferably, with a leading signal causing each intermediate cell (if any) and the destination cell(s) to treat the received characteristics accordingly to lead them to arrive at the identified requesting cell. As mentioned above, such leading signals and characteristics may be pulsed, in intervals, such that gaps in ordinary power provision from the source, intermediate and destination cells due to signal and characteristic distribution is negligible, and/or rectifiable by an adjustment in power during the subsequent ordinary power transmission cycles undertaken by the cells and control system(s). The control system may use the H.P.A.S., a switching complex (such as the variable conducting and/or communication selection complex 807) to rapidly issue, at high power, such supplementation signals, and manage the preparation and sending of pulsed or otherwise transmitted power or other requested characteristics.

If, as determined in step 923, the cell receiving a signal requesting supplementation has insufficient resources to fully supply the requested supplementation the control system may next, in step 927, determine whether it has sufficient resources to, at least partially supply such characteristics. If so, in step 929, the control system next proceeds to create and/or transmit such partial supplemental characteristics, preferably, also with a leading signal causing each intermediate cell (if any) and the destination cell(s) to treat the received characteristics accordingly to lead them to arrive at the identified requesting cell. In addition, in step 931, the control system may relay additional, adjusted request signals, requesting the remaining, unfulfilled needs of the destination cell, which have not yet been supplied. Preferably, such signals are sent farther upstream of the current or charge flow, but also destined to the first (nearest) cell with surplus resources for fulfilling the request without jeopardizing its own present performance. In some embodiments, however, supplementation may take place even when present performance of a cell may be hindered (such as when it has no surplus, contributable electrical characteristics) if received signals indicate that average or other cell performance is suffering even more greatly, and a distribution of resources is, nonetheless warranted. In such embodiments, specialized "distress" signals, following communication with all cells without supplementation, may be issued by the requesting cell(s). Again, in step 921, the control system may next pass along signals destined for other cells. However, a limit may be employed by the system on extreme levels of electrical characteristics, after which levels are sensed, no further discharging (or charging, in the case of overcharge) will be permitted for such cell(s) by the system.

Once again, the embodiments discussed with reference to the figures are illustrative only, and do not exhaust the many possibilities that fall within the scope of the invention. In some embodiments, for example, separate terminals and connections may be implemented for addressing and exporting electrical characteristics simultaneously with ordinary power delivery from and to cells, rather than common terminals used at different times for ordinary power delivery and the export of such characteristics. However, the shared terminals and other pathways set forth above are preferred because they greatly lower manufacturing costs and allow for sharing more robust connections.

Figure 10:
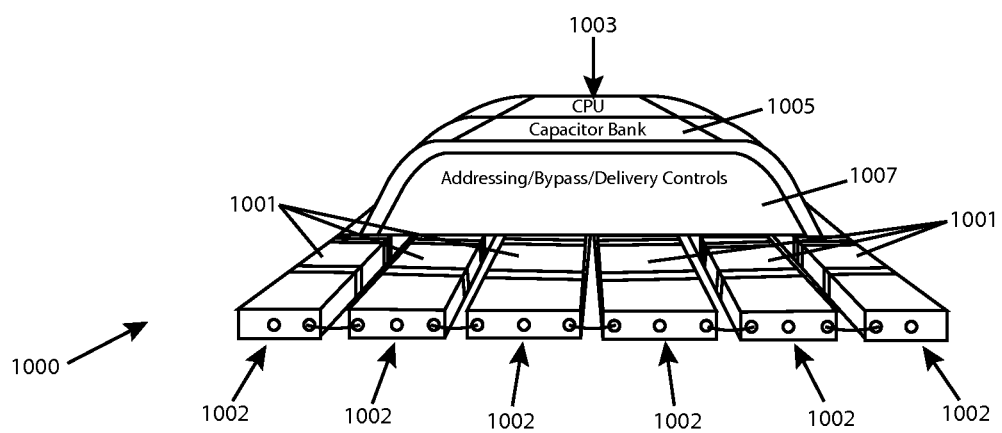
FIG. 10 is a perspective drawing depicting an exemplary complex of battery cells, arranged in several rows of such cells placed in series, and comprising an overarching control system, auxiliary power storage, and variable cell-addressing, -bypassing and "hot-swapping" hardware, in accordance with aspects of the present invention.

FIG. 10 is a perspective drawing depicting an exemplary complex 1000 of battery cells (examples of which are shown as 1001), arranged in several rows 1002 of such cells placed in series, and comprising an overarching control system 1003, auxiliary power storage 1005, and variable cell-addressing, -bypassing and "hot-swapping" hardware, in accordance with aspects of the present invention. "Hot-swapping" generally refers to aspects of the invention where a control system may, while substantially maintaining an active circuit with a current, conductively isolate at least one cell, or an electrical characteristic(s) or capability(ies)-generating part or reagent thereof, from a position where it has, or may have, been delivering power at least partially in the circuit and/or introduce, also while maintaining a substantially active circuit with current, at least one battery cell or an electrical characteristic(s) or capability(ies)-generating part or reagent thereof, into a circuit, for the purpose of optimizing, equalizing or otherwise improving or selecting the distribution of voltage, charge, current, resistance, power and/or other electrical characteristics of a circuit.

In some preferred embodiments, a control system, such as control system 1003, more specific examples for which are provided below, in reference to FIG. 13, controls an array of separable conductors for positive and negative terminals of each cell 1001, for example, with the use of a variable switching hardware 1007, and may further operate variable conduction, auxiliary storage, electrode and/or electrolyte reaction-controlling-, or other hardware, such as the hardware types and examples set forth elsewhere in this application. Using variable switching hardware 1007, or such other conduction and conduction path changing hardware, control system 1003 may place any cell, or aspect or part of any cell (e.g., sections of electrode material, as in embodiments discussed below), in terms of electrical conduction or characteristic(s) or capability(ies), in any order (for example, series or parallel, or partially series or parallel) circuit arrangements with any other cell(s) in common circuits, and remove any cell or electrical characteristic, capability, aspect or part (e.g., sections of electrode material, as in embodiments discussed below) thereof from any order with any other cells in common circuits. To select optimal orders, the control system 1003 may first test the capacity, charge state, voltage, temperature, internal resistance and efficiency during power transmission or generation, or any other electrical or performance characteristic, capability or aspect relevant to each or any battery cell's, or aspect thereof's, state and capabilities, and may assess potential states and capabilities of any battery cell or aspect thereof across a projected charge or discharge curve, and in multiple activity scenarios with or without partial bypass and with or without electrolyte or electrode section or other electrochemical reagent actuation. The system may then compare the projected possible outcomes and select an optimized, most efficient projected arrangement among the possibilities set forth above, and with an assessment of the likely load(s) or other duties to be encountered by the system, which may be informed by present and prior historical use of the system, a cell or a part thereof as well as templates or other indicators of patterns for such use. The system may also, or alternatively, assess such characteristics of an entire series of battery cells or parts thereof, or each such series group of battery cells or parts thereof, and compare it/them to ideal levels for application to an appliance and/or to other series of battery cells. Based on those results, the control system may rearrange individual, several and/or groups of battery cells, or aspects or parts thereof, placing them in new series or other common circuits to better optimize each series, and or bypass or partially bypass or otherwise isolate or retract from reaction at least one cell, reagent, reagent section, or other part or aspect of a cell, to obtain ideal, equal, matched or otherwise better characteristics and/or average or blended characteristics in each newly created series. In some embodiments, the system may, through bypassing some cells or parts thereof and regrouping remaining cells or parts thereof, create fewer series, but each with a desired voltage, power output and/or current for servicing the appliance.

In addition, the control system 1003 may use a flexible auxiliary power source, such as that pictured as capacitor bank 1005, which may be charged to a degree determined by the control system to be necessary or optimal in at least some respect in advance of use, during recharging, or during use of the complex 1000 (for example, by ambient power sources and/or from surplus power from any of the cells 1001) or from any other power source accessible for such charging, for a variety of purposes to facilitate the function of the complex 1000. For example, control system 1003 may use the auxiliary power source to address and replace cells or parts thereof with critical conditions, or fill gaps in power delivery resulting from hot-swapping, balance cells, parts or series of cells, and/or repair, recharge and/or replace lagging or bypassed cells, among other possible needs or beneficial uses.

Although, as in other embodiments of the invention set forth above, the embodiments discussed with reference to FIG. 10 may emphasize rows of series-connected battery cells, it is within the scope of the present invention that the electrical characteristics exporting, leading signals and hot-swapping of cells may be carried out with respect to, and create configurations of, cells or parts thereof in any other form of initial or ending circuit or configuration, including parallel, partially parallel and other arrays of battery cells and parts thereof.

Figure 11:
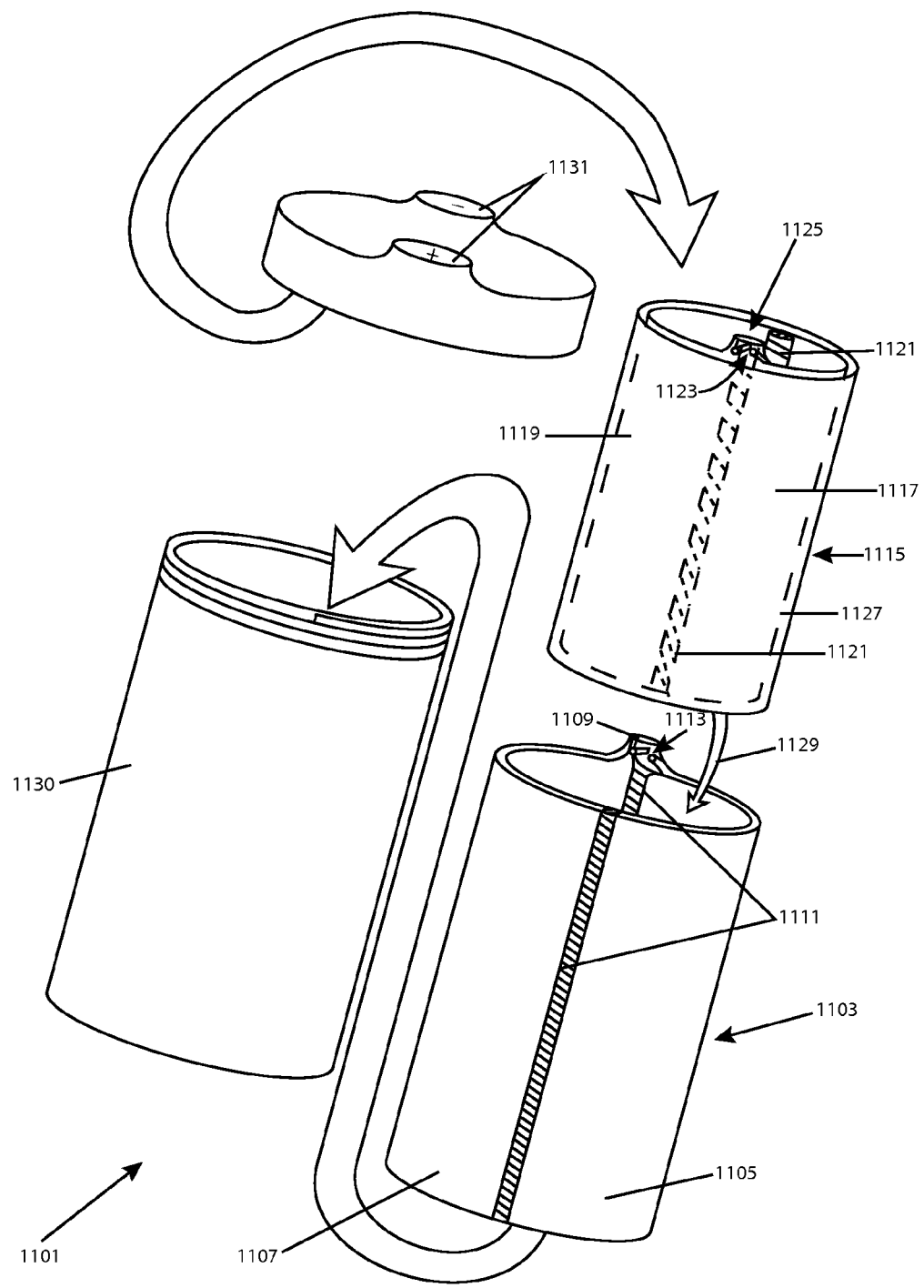
FIG. 11 is a perspective drawing of exemplary parts of a battery cell system with variably-engageable sections of electrode, cathode and electrolyte materials.

FIG. 11 is a perspective drawing of exemplary parts of a battery cell system 1101 with variably-activated, separable sections of electrode, cathode and electrolyte materials. A substantially hollow-cylindrically-shaped major anode material section 1103 is pictured, comprising two exemplary sections, 1105 and 1107, of anode material. Each section, 1105 and 1107, is variably electrically insulated from one another and a charge delivery contact 1109, by virtue of insulation, such as insulation barriers 1111, and a system-variable switch, such as that pictured as 1113. A battery hardware control system may variably actuate switch 1113 to engage more or less electrode material and/or associated electrolyte materials in which it is immersed, in section 1105 to conduct charge to contact 1109. In the example pictured, section 1107, by contrast, is constantly connected with, and conducting charge to, contact 1109. Thus, by variably engaging section 1105 with contact 1109 via switch 1113, a control system is capable of variably adding the increased power delivery capabilities, and the applied capacity, of section 1105 to those of section 1107. As will be explained in greater detail below, by rapidly engaging and disengaging section 1105, and or a similar connectable/disconnectable cathode section, discussed below, for limited times virtual electrical characteristics, different from the inherent characteristics of the electrode material, can be created. For example, if a different type of electrode material, with a different electrochemical reaction potential and electrode potential, is held in section 1107 than that in section 1105, the control system may activate section 1105 for a fraction of the time (for example, in activation cycles) yielding an effective potential at the battery contacts with a blended or otherwise unique electrical potential selectable by the system. By testing the effective potential output by the cell with different fractions of overall time generating current from the switchable section 1105, and patterns thereof, the system may further assess and create a wide variety of potentials (for example, an additional potential to fill in a detected gap in electrical characteristics created by another cell within a common circuit with system 1101).

Similarly, a substantially hollow-cylindrically-shaped major cathode material section 1115 is pictured, also comprising two exemplary sections, 1117 and 1119, at least one of which is of system-variably-engagable/activatable cathode material, similarly variably insulated by insulation material, such as insulation barriers 1121, and system-actuable switch hardware 1123. By controlling switch 1123, a control system may engage/activate or sequester the electrical charge- and power- and other characteristics- and capabilities-delivering effects of section 1117, and, when engaged/activated deliver it to a positive electrical contact 1125. The selectably-connected anode and cathode sections, 1105 and 1117, may be activated or isolated in unison, or in another complementary fashion by a control system, such as by activating the anode section 1105 first, and the cathode section afterword, while leaving them simultaneously engaged for a period of time. In some embodiments, an electrolyte/separator between the anode and cathode sections 1103 and 1115 may also be selectably engaged, or contain selectably engaged isolated sections, or contain an activatable electrolyte component (such as ions, or a system-changeable concentration of ions) which, when altered by a control system, may be used to create different potentials and other electrical characteristics, or virtual characteristics, for example, to address a gap or other shortage in the cell or other cells or power sources in a common circuit with the cell.

When cell system 1101 is manufactured, sections 1103 and 1115 may fit within one another, as shown by combination motion arrow 1129, and an insulating or electrolytic separation material, such as 1127, may separate them from one another, and other materials. Finally, the combined pair of major sections 1103 and 1115 may be placed within housing materials 1130 and contact extension materials 1131, the latter of which serves as a cap threadable onto the former, and forming inner conductive contacts with contacts 1109 and 1125.

In practice, many more anode and cathode material sections, such as sections 1103 and 1115, and conductive switches and insulated sub-sections may be combined in a single cell system and housing (such as 1130), thereby greatly increasing the type and degree of electrical capabilities and characteristics that a control system may supply upon demand to an electrical circuit in which the combined battery cell system 1101 may be installed. As with other embodiments of the invention, discussed above, a control system may be provided on board the battery cell 1101, or may be located externally or on board another cell, and may commonly manage and control several such cells.

Figure 12:
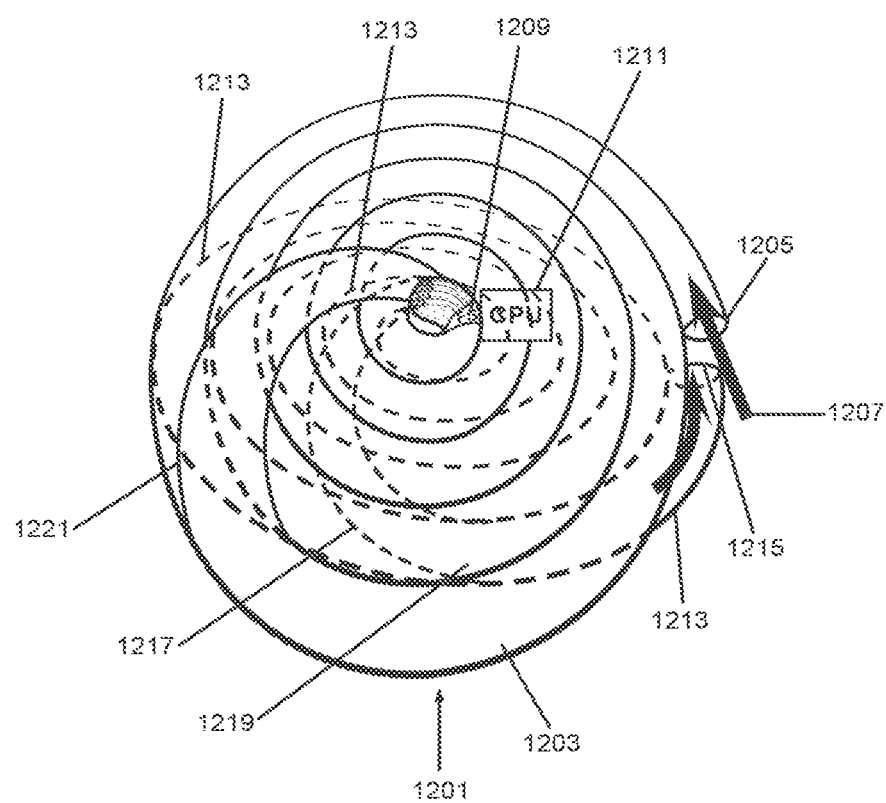
FIG. 12 is a perspective drawing of an exemplary variable-, selectable-length, switchable fiber-optic run system, for altering and delivering electromagnetic or other radiation power, or other electrical or electromagnetic characteristics and capabilities in accordance with aspects of the present invention.

FIG. 12 is a perspective drawing of an exemplary variable-, selectable-length, switchable fiber-optic run system 1201, for altering and delivering electromagnetic or other radiation power, or other electrical or electromagnetic characteristics and capabilities in accordance with aspects of the present invention. A primary spiral coil of optical fiber 1203 receives electromagnetic radiation from an input 1205, as demonstrated by initial propagation direction arrow 1207. As electromagnetic radiation so enters primary coil 1203, it spirals, within the confines of coil 1203, inward until reaching a central propagation pathway switching unit 1209, which may be controlled by a control system/central processing unit 1211. Control system 1211 may actuate switching unit 1209 to focus and/or guide electromagnetic radiation, radiation rays, or other units, groups and/or signals to one of a number of outlet paths, which have various lengths. As an example of the switching hardware 1209, a control-system actuable lens, beam-splitter, mirror or pathway altering electrically-actuated media may be used (along with control-system controlled actuators affecting it/them) to so select and channel radiation or other units, groups or signals to any of the selected various available fiber optic paths. Some available, switchable outlet paths lead carried electromagnetic radiation through an exit spiral 1213 of comparable length to the primary coil 1203, which may then be delivered or re-routed from an outlet 1215. Other selectable pathways are shorter, such as bypass route 1217, which, if selected, leads electromagnetic radiation to enter an outermost spiral location 1219 of exit spiral 1213. Another selectable route out from the center, 1221, may lead the guided, propagated radiation to re-enter the primary coil 1203, and, if such a path is repeatedly selected by a control system, may lead to a virtually unlimited distance path, prior to the system selecting a path leading to outlet 1207, as shown by propagation arrow 1225.

By selectively using the switching hardware to select among and use the many possible propagation paths to channel radiation, or units and groups thereof, or signals, run system 1201 may be used to store electromagnetic energy or other characteristics during transmission, compile, separate, combine or otherwise alter an output electromagnetic power carrier over time, and create different levels of power delivery, or other characteristics or capabilities, for delivery at an outlet or appliance at different user and/or control-system directed times. An exemplary control system for managing system 1201, and other aspects of the present invention, is provided below, in reference to FIG. 13.

Figure 13:
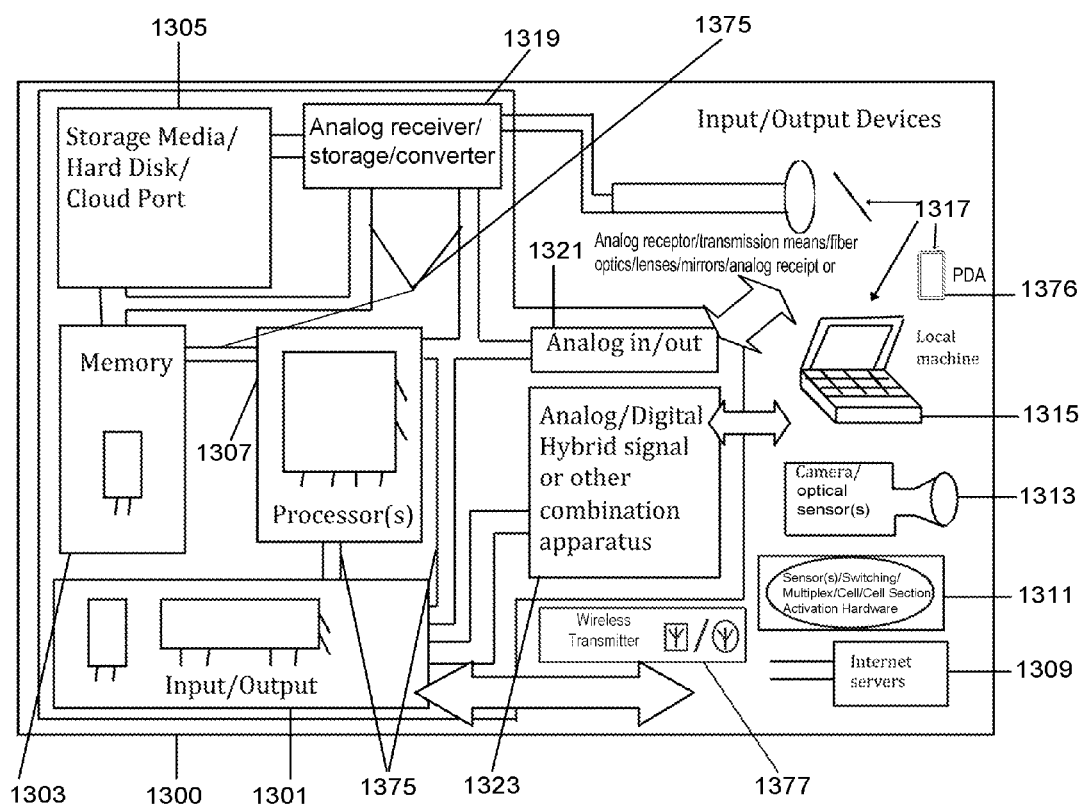
FIG. 13 is a schematic block diagram of some elements of an exemplary control system that may be used in accordance with aspects of the present invention.

FIG. 13 is a schematic block diagram of some elements of an exemplary control system 1300 that may be used in accordance with aspects of the present invention, such as, but not limited to, increasing electrical characteristics and capabilities of a battery cell, selectively bypassing and/or hot-swapping battery cells, exporting addressed power and/or other electrical characteristics and coded signals from battery cells, receiving or relaying such signals and/or characteristics and/or managing other battery cell hardware. The generic and other components and aspects described herein are not exhaustive of the many different systems and variations, including a number of possible hardware aspects and machine-readable media that might be used, in accordance with the present invention. Rather, the system 1300 is described to make clear how aspects may be implemented. Among other components, the system 1300 includes an input/output device 1301, a memory device 1303, storage media and/or hard disk recorder and/or cloud storage port or connection device 1305, and a processor or processors 1307. The processor(s) 1307 is (are) capable of receiving, interpreting, processing and manipulating signals and executing instructions for further processing and for output, pre-output or storage in and outside of the system. The processor(s) 1307 may be general or multipurpose, single- or multi-threaded, and may have a single core or several processor cores, including, but not limited to, microprocessors. Among other things, the processor(s) 1307 is/are capable of processing signals and instructions for the input/output device 1301, analog receiver/storage/converter device 1319, analog in/out device 1321, and/or analog/digital or other combination apparatus 1323 to cause a display, light-affecting apparatus and/or other user interface with active physical controls, such as a battery cell replacement or failure-indicating interface (any of which may be comprised or partially comprised in a GUI) to be provided for use by a user on hardware, such as a specialized personal computer monitor or PDA (Personal Digital Assistant) screen (including, but not limited to, monitors or touch- and gesture-actuable displays) or terminal monitor with a mouse and keyboard or other input hardware and presentation and input software (as in a software application GUI), and/or other physical controls, such as a button, knob or LEDs for determining battery replacement, bypass, proper installation, or other battery conditions or statuses or related circuit or other characteristics. Alternatively, or in addition, the system, using processors 1307 and input/output devices 1319, 1321 and/or 1323, may accept and exert passive and other physical (e.g., tactile) user, battery, circuit and environmental input (e.g., from sensors) and output.

For example, and in connection with aspects of the invention discussed in reference to the remaining figures, the system may carry out any aspects of the present invention as necessary with associated hardware and/or using specialized software, including, but not limited to, controlling electrical characteristics sensors, an auxiliary storage/H.P.A.S. or other power storage device and associated conducting, addressing, leading signal communication device and/or selection complex, variably-activating electrode or electrolyte sections, converters, transformers, variable-length conduit path switches, and other characteristics modification, delivery and addressing hardware, a multiplex conduction system for hot-swapping, variably isolating, reordering, repairing or otherwise variably adjusting networked battery cells, and may implement other controls, power and other characteristics effectuated through such multiplex, network system, and the networked devices themselves or other computer systems. The system may also, among many other things described for control systems in this application, respond to user, sensor and other input (for example, by a user-actuated GUI controlled by computer hardware and software or by another physical control) to issue alerts, alter settings, carry out repair activities, and halt the conduction of current and power from a cell upon detecting critical condition(s) monitor the status and inventory of battery cells, an appliance and a circuit in general, or perform any other aspect of the invention requiring or benefiting from use of a control system. The system 1301 may permit the user and/or system-variation of settings, including but not limited to the affects of user activity on modes of operation of the system, and send external alerts and other communications (for example, to users and administrators) via external communication devices, for any control system aspect that may require or benefit from such external or system-extending communications.

The processor(s) 1307 is/are capable of processing instructions stored in memory devices 1303 and/or 1305 (and/or ROM or RAM), and may communicate with any of these, and/or any other connected component, via system buses 1375. Input/output device 1301 is capable of input/output operations for the system, and may include/communicate with any number of input and/or output hardware, such as a computer mouse, keyboard, entry pad, actuable display, networked or connected second computer, other GUI aspects, camera(s) or scanner(s), sensor(s), sensor/motor(s), actuable battery cells (with actuation instruction receiving and following hardware), specialized cell, cell-array and other radiation or electrical characteristics storage and transmission affecting hardware, as discussed in this application, range-finders, GPS systems, receiver(s), transmitter(s), transceiver(s), transflecting transceivers ("transflecters"), antennas, electromagnetic actuator(s), mixing board, reel-to-reel tape recorder, external hard disk recorder (solid state or rotary), additional hardware controls (such as, but not limited to, buttons and switches, and actuators, current or potential applying contacts and other transfer elements, light sources, speakers, additional video and/or sound editing system or gear, filters, computer display screen or touch screen. It is to be understood that the input and output of the system may be in any useable form, including, but not limited to, signals, data, commands/instructions and output for presentation and manipulation by a user in a GUI. Such a GUI hardware unit and other input/output devices could implement a user interface created by machine-readable means, such as software, permitting the user to carry out any of the user settings, commands and input/output discussed above, and elsewhere in this application.

1301, 1303, 1305, 1307, 1319, 1321 and 1323 are connected and able to communicate communications, transmissions and instructions via system busses 1375. Storage media and/or hard disk recorder and/or cloud storage port or connection device 1305 is capable of providing mass storage for the system, and may be a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, or may simply be an internal mass storage device, such as a computer hard drive or optical drive.

Generally speaking, the system may be implemented as a client/server arrangement, where features of the invention are performed on a remote server, networked to the client and made a client and server by software on both the client computer and server computer. Input and output devices may deliver their input and receive output by any known means of communicating and/or transmitting communications, signals, commands and/or data input/output, including, but not limited to, input through the devices illustrated in examples shown as 1317, such as 1309, 1311, 1313, 1315, 1376 and 1377 and any other devices, hardware or other input/output generating and receiving aspects. Any phenomenon that may be sensed may be managed, manipulated and distributed and may be taken or converted as input or output through any sensor or carrier known in the art. In addition, directly carried elements (for example a light stream taken by fiber optics from a view of a scene) may be directly managed, manipulated and distributed in whole or in part to enhance output, and radiation or whole ambient light or other RF information for an environmental region may be taken by photovoltaic apparatus for battery cell recharging, or sensor(s) dedicated to angles of detection, or an omnidirectional sensor or series of sensors which record direction as well as the presence of electromagnetic or other radiation. While this example is illustrative, it is understood that any form of electromagnetism, compression wave or other sensory phenomenon may become such an "ambient power" source and include such sensory directional and 3D locational information, which may also be made possible by multiple locations of sensing, preferably, in a similar, if not identical, time frame. The system may condition, select all or part of, alter and/or generate composites from all or part of such direct or analog image or other sensory transmissions, including physical samples (such as DNA, fingerprints, iris, and other biometric samples or scans) and may combine them with other forms of data, such as image files, dossiers or metadata, if such direct or data encoded sources are used.

While the illustrated system example 1300 may be helpful to understand the implementation of aspects of the invention, it is understood that any form of computer system may be used to implement many control system and other aspects of the invention—for example, a simpler computer system containing just a processor (datapath and control) for executing instructions from a memory or transmission source. The aspects or features set forth may be implemented with, as alternatives, and/or in any combination of, digital electronic circuitry, hardware, software, firmware, or in analog or direct (such as electromagnetic wave-based, physical wave-based or analog electronic, magnetic or direct transmission, without translation and the attendant degradation, of the medium) systems or circuitry or associational storage and transmission, any of which may be aided with enhancing media from external hardware and software, optionally, by wired or wireless networked connection, such as by LAN, WAN or the many connections forming the internet or local networks. The system can be embodied in a tangibly-stored computer program, as by a machine-readable medium and propagated signal, for execution by a programmable processor. The method steps of the embodiments of the present invention also may be performed by such a programmable processor, executing a program of instructions, operating on input and output, and generating output. A computer program includes instructions for a computer to carry out a particular activity to bring about a particular result, and may be written in any programming language, including compiled and uncompiled, interpreted languages, assembly languages and machine language, and can be deployed in any form, including a complete program, module, component, subroutine, or other suitable routine for a computer program.

Figure 14:
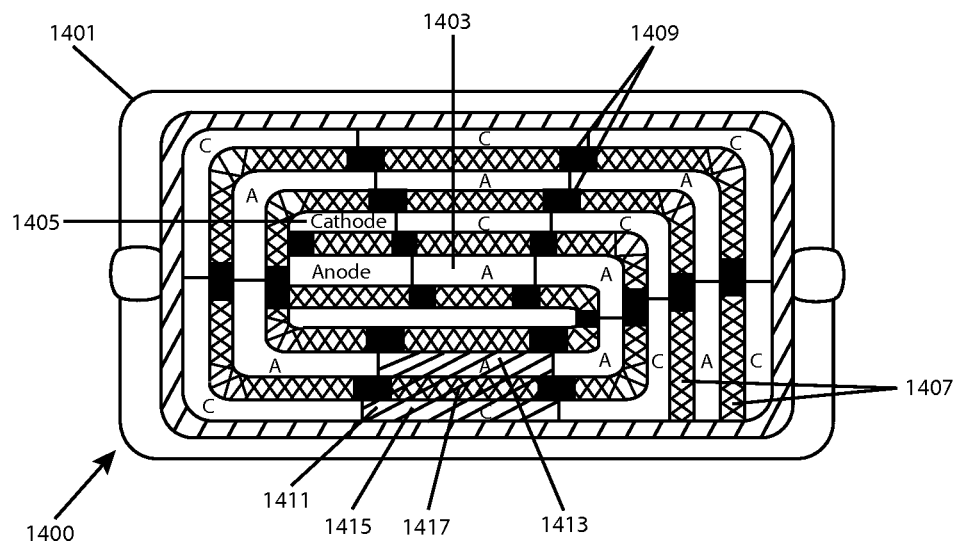
FIG. 14 is a top view depicting a control system-variable battery with separate connectable anode and cathode sections, in accordance with aspects of the present invention.

FIG. 14 is a top view depicting a control system-variable battery 1400 with separate connectable anode and cathode sections. Layers of anode material 1403 and cathode material 1405 are separated by separator layers 1407, which contain an electrolyte. Electrode materials 1403 and 1405 and separator layer(s) 1407 each comprise periodic or otherwise regularly-spaced internal insulating compartment separation strips, such as those examples shown as 1409, which are so periodic or otherwise regularly-spaced that, when wound together in spiral layers (as pictured), they align with one another laterally, creating electrically insulated cathode/anode pairings, an example of which is shown as pairing 1411, illustrated by the commonly shaded anode section 1413, cathode section 1415, and separator section 1417. Each such pairing 1411 comprises a separable (separately activatable by switches for electrical conduction) section of anode material, such as that shown as 1413, and a separable section of cathode material, such as that shown as 1415, and a section of separator material, such as that shown as 1417, between them. Thus, when various groups of such cathode/anode pairings are activated by electrical connection and variably arranged and related with other pairings and other circuit components, with additional cell and cell-part arrangement-altering circuitry and hardware, such as that which is discussed elsewhere in this application, the available capacity and certain other electrical characteristics of the entire battery 1400 may be varied by a control system, such as a control system comprising hardware and software.

An example of such a hardware and software control system is provided with reference to FIG. 13, above.

A pairing of electrically insulated cathode/anode sections such as pairing 1411 may be activated, for example, by switches (not pictured) actuated by such a control system that variably connect separate electrical leads or other conduction materials (which, in some embodiments, comprise or are connected to an electrical contact or contacts for the battery) to each section of electrolyte material, such as sections 1413 and 1415. A control system may also employ other circuit-varying hardware to place any pairing or anode or cathode connection in any parallel, series or other circuit order (or partially parallel, series or other circuit order) with any other circuit element. For example, multiplex connection hardware, such as that discussed with reference to FIG. 10, but connected to pairings or electrode material, may allow the control system to isolate and vary the order of the connected pairings, electrode material and other circuit elements. By controlling the timing of activation or isolation of connected pairings and electrode (switching their connection to the circuit "on" or "off," for periods of time or in cycles or other activation patterns), the control system may also effectively limit their contribution to the circuit, and create virtual properties that differ from the general properties of the battery, its materials, and pairing. For example, because each pairing may be significantly smaller than the overall battery, containing less electrolyte and electrode material, the pairings may be able to experience voltage drop from use more quickly than a larger cell and, by engaging pairings one-at-a-time, rather than all at once, the control system can effectively create a lower voltage from the battery, or, by selecting more than one pairing simultaneously, and/or by overlapping engagement, a wide variety of other effective voltages may be selected and contributed to the circuit, at the election of a control system and/or user. In addition, or as an alternative, such pairings or electrode material sections may be placed in parallel or in series with one another, and other circuit elements, to create different voltages, current, resistance, capacities, and other electrical characteristics, and such arrangements can be varied over time by the control system to achieve a wide variety of possible battery performance and characteristics. As another example, pairings of electrode materials may also comprise isolated, or switchably isolated, sections of electrolyte and separator material through which ion transfer takes place, and the concentration or other properties of the electrolyte may be actually varied by the control system to, for example, change the effective potential of the pairing and/or cell. In addition, different pairings accessible by the system may contain a variety of different electrode and electrolyte/separator materials, with differing galvanic properties, yielding accessible potentials or other electrical characteristics accessible for application by the battery cell system. Such selected characteristics and battery performance can be varied over time by the control system, for example, to meet varying loads or other needs experienced by the circuit, and/or sensed by the control system, or to monitor and alter the actual output by the cell, sensed by the control system, to meet the needs or a nominal or standard actual voltage of the cell (or cell's type), or to monitor a circuit's or other electrical cell's characteristics, and/or supply gap-filling potentials or other electrical characteristics.

Figure 15:
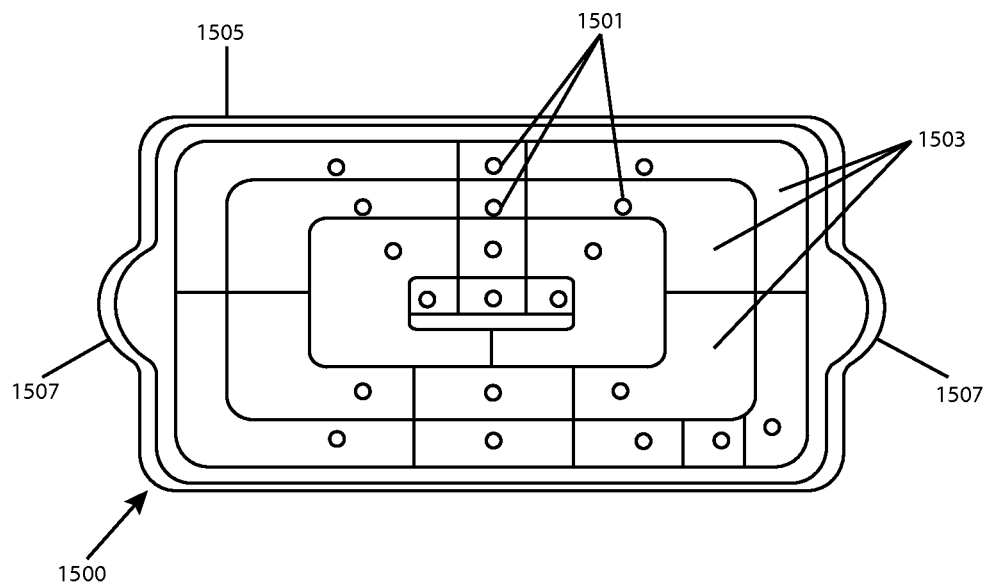
FIG. 15 is a bottom, inside view depicting a battery cap for use with a battery with separate connectable anode and cathode sections, such as the battery discussed with reference to FIG. 14, above.

FIG. 15 is a bottom, inside view depicting a battery cap 1500 for use with a battery with separate connectable anode and cathode sections, such as the battery discussed with reference to FIG. 14, above. Cap 1500 can be fastened or merged with a battery housing, and, when so fastened or merged, comprises a part of the battery housing, such as housing 1401. On its interior surface, cap 1500 includes plural isolated, switchable contacts, such as those examples shown as 1501, which, when cap 1500 is mounted on a battery, completing its housing, each contact a separated, insulated electrode material section (which may be part of a pairing), or electronic leads to electrode material sections, such as the sections and pairings discussed above, with reference to FIG. 14. In addition, control-system-switchable contacts 1501 may conduct electricity to switching and other connection-varying hardware, or leads thereto, such as electrically isolatable lead examples 1503.

A control system, such as a control system comprising hardware and software, examples of which are discussed above, may actuate hardware (not pictured) switching any of leads 1503 and/or contacts 1501, on or off, such that electrical conduction pathways may be completed between selected: (A) sections of anode material, (B) sections of cathode material or (C) pairings or other groups of electrode and/or electrolyte materials.

Cap 1500 preferably comprises an outer housing material 1505 and complementarily-shaped (in comparison to the shape of housing 1400 of the battery) lips 1507, which, when cap 1500 is installed onto battery 1400, completing its housing, overlaps and conforms with the shape of outer housing material 1401. A manufacturing process may then preferably weld or otherwise bond housing material 1505 with housing material 1401 at their areas of overlap to complete a fluid-tight seal. Alternatively, or in addition, an o-ring, gasket or other sealing device may aid in creating a fluid-tight seal. In addition, a safety valve may be included in the completed, merged housing to release pressure or permit the flow of gases or other fluids under some conditions, to improve the function of the battery.

Figure 16:
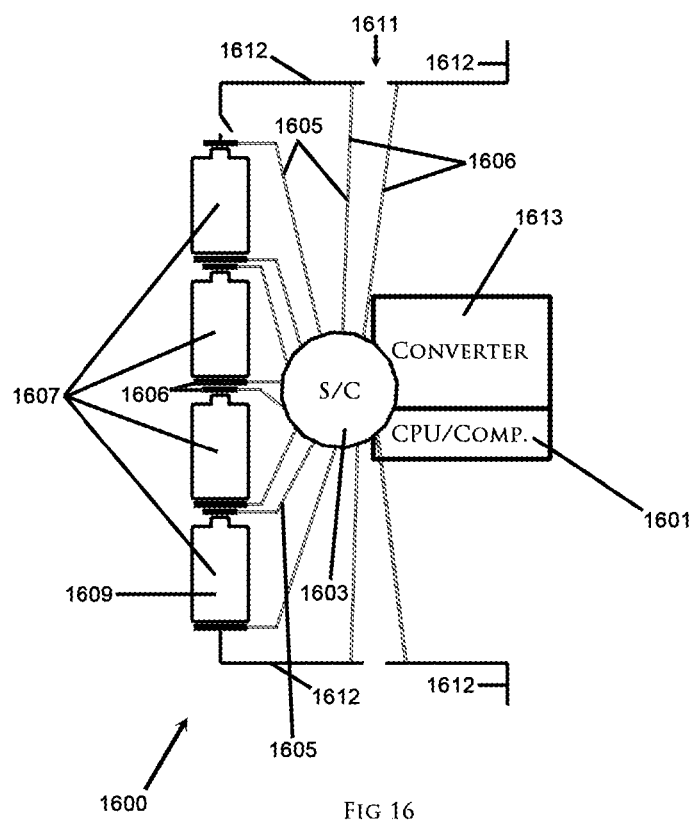
FIG. 16 is a schematic diagram depicting an exemplary specialized power system of switchable electronic devices in a variable circuit controlled by a hardware and software control system, in accordance with aspects of the present invention.

FIG. 16 is a schematic diagram depicting an exemplary specialized power system 1600 of switchable electronic devices in a variable circuit controlled by a hardware and software control system, such as that partially pictured as 1601, in accordance with aspects of the present invention. The control system 1601 can be a wide variety of possible forms and, in some embodiments, comprises a computer and/or central processing unit ("C.P.U."). Some examples of possible control system embodiments are discussed above, for example, with reference to FIG. 13. In some embodiments, control system 1601 controls a switching/control unit 1603, which controls electrical conduction through variable electrical connections. For example, control system 1601 may actuate switching to turn variable electrical buses or other connectors, such as those examples pictured as buses 1605 and battery contacts 1606, on or off (conducting electricity in a circuit or isolated from doing so) and separately place circuit components connected to any of 1605 in any parallel or serial order, or partially so or in combinations thereof, with one another. For example, control system 1601 may actuate switching/control unit 1603 to connect one of battery cells 1607, such as battery cell 1609, at an input and/or output position in a circuit selected by the control system, such as position 1611 within circuit wiring 1612, by activating and connecting its positive and negative contacts to buses/connectors 1606. In addition, control system 1601 may first channel the output of cell 1609 through a converter 1613, and also control converter 1613 to modify the voltage, current, resistance, duration(s), signal aspects (such as embedded encoding) or any other electrical characteristic output by cell 1609, prior to connecting it to position 1611 (or such other position as may be selected by the system 1601). In addition to such reordering, and conversion, switching/control unit 1603 may be actuated by the control system 1601 to isolate, bypass and/or partially bypass any such battery cell or other circuit component from conducting or connecting electricity or other electrical characteristics or capabilities from a circuit, or a part thereof, for example, providing only partial contribution of electrical characteristics (e.g., and converting that contribution) from such a component. In a preferred embodiment, if the power system has been activated by a user or the control system (for example, to run an appliance or make power available for running an appliance), the control system first assesses the needs of a load (or loads) present in the present circuit. If no external load is present, system 1601 next senses electrical characteristics of at least some of cells 1607, or a circuit order arrangement of plural cells such as 1607, and, preferably, at least the voltage of each of cells 1607, or all of cells 1607, placed in series. Based on those readings, the system may determine whether any of cells 1607, or the arrangement of at least some of cells 1607 fails to match a nominal, normal, or otherwise expected or default amount (or amounts) of such characteristics for the cells or for the arrangement. If so, the system may next route at least one cell, and, preferably, at least a properly functioning cell with a relatively high state of charge in comparison to others, or a cell with other greater characteristics than other cells, and convert its output (by routing its output through converter 1613, using switching/controller 1603) to that level necessary to fill/subtract the gap in voltage or other characteristics caused by the failure to match an expected or default amount.

Figure 17:
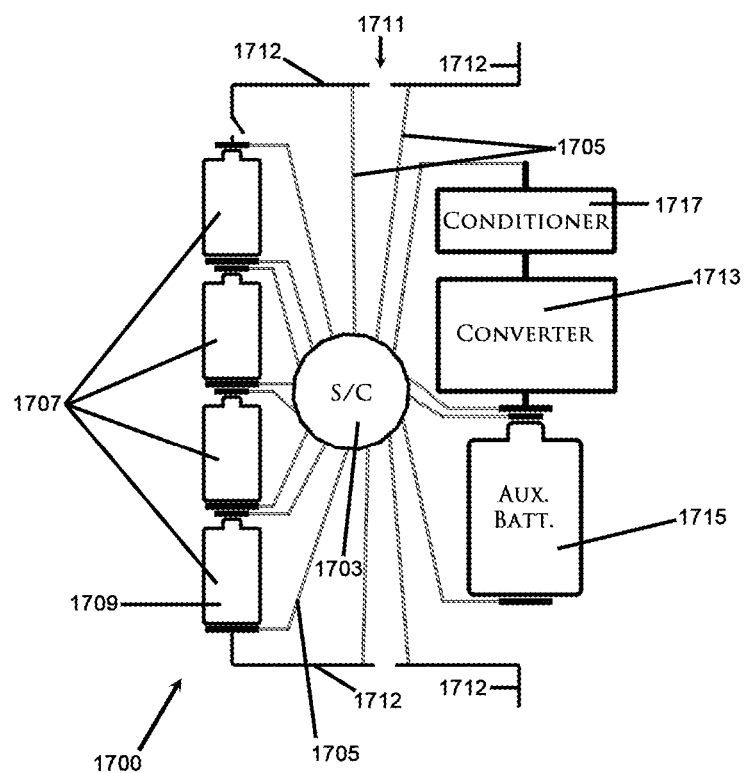
FIG. 17 is a schematic diagram depicting another, more complex exemplary specialized power system of switchable electronic devices in a variable circuit controlled by a hardware and software control system, in accordance with aspects of the present invention.

FIG. 17 is also a schematic diagram depicting an exemplary specialized power system 1700 of switchable electronic devices in a variable circuit controlled by a hardware and software control system, in accordance with aspects of the present invention. Although, as with power system 1600, above, power system 1700 may comprise a control system, the control system is not separately pictured in FIG. 17, for simplicity. However, it should be understood that a control system with the same general abilities, and of the same possible forms as discussed above, may be used, and may control, connect, isolate and reorder in the pathway of a circuit any component within the circuit, among other additional capabilities for control systems set forth above. The control system may also be present in and or connected for power transmission, signaling and hardware actuation control, to any component pictured in the diagram or within a circuit. Similar devices and other components as discussed in reference to FIG. 16 are provided, labeled with the same latter two digits, for clarity, in FIG. 17. Because the functions and possible isolation, bypass, partial bypass, and ordering, reordering, conversion and selectable input and output positions of the analogous devices and components with the same latter two digits are similar, they are not discussed again at length here. However, power system 1700 comprises additional device components, auxiliary battery 1715 and output conditioner 1717. As with the other components shown and carried over from FIG. 16, device components 1715 and 1717 may be variably connected and ordered by a control system actuating switching (using a switching/controller, now 1703) to turn variable electrical buses or other connectors, such as those examples pictured as 1705, on or off (conducting electricity in a circuit or isolated from doing so) and place circuit components connected to any of 1705 in any parallel, serial or other order, or combinations thereof, with one another. Rather than only convert the output of a battery cell, and/or reorder it for power delivery, power system 1700 has additional flexibility to store power or other electrical characteristics and/or capabilities within auxiliary cell 1715 for use when needed for gap filling or other electrical characteristics-supplying activities, and may convert such characteristics or capabilities by activating cell 1715 and converting its output and placing it at any desired possible output location and order in a circuit so accessible by the control system. Preferably, cells 1707 and 1715 are each fully charged by an external power source, but a series arrangement of cells 1707, only, is initially created for power output by the power system 1700, in an ordinary power output mode. As the circuit is thus used, however, one or several of cells 1607 may begin to lag in its performance, with a lower voltage, output voltage, power, lower current, or greater resistance, among other possible electrical characteristics creating a "gap" in comparison to the initial, or otherwise expected output of the series. At that point, the control system may selectively at least partially bypass such a cell, and may begin to supply gap-filling performance, voltage, output voltage, power, current or other characteristics or capabilities, by activating cell 1715 and converting its output characteristics and/or capabilities for placement in the same ordered position as the cell, relative to the other cells and circuit components or, alternatively, to a new output position, such as 1711. In this way, power system 1700 is able to actively monitor the circuit's performance, compare it to a standard or otherwise expected performance capability, and maintain that performance, with no need to address the particular needs of a load. However, in some embodiments, such needs are also monitored and addressed by the variable output capabilities of the power system 1700. In addition to converting power, voltage and other electrical characteristics and capabilities via a converter, now 1713, power system 1700 may further selectively condition power output using conditioner 1717. For example, if the control system's activities in restoring ordinary operating power fails to fully fill a detected gap, or if further anomalies, gaps, interruptions or spikes in power output arise from the control system's operation, power, voltage, current and other output electrical characteristics and capabilities may be smoothed or otherwise re-patterned to normalize or otherwise improve them prior to output to an appliance.

Because the control system (or systems) may place each cell 1707 (or 1607) in any order with one another, using switching/control unit 1703 (or 1603), a wide variety of alternative series, parallel, partially series, and/or partially parallel arrangements may be created, and then output, anywhere in the circuit (for example, at additional locations for switchable output contacts, in addition to, or instead of location 1711, to optimize the performance of the circuit and power sources thereof. For example, in some embodiments, each cell 1707 may be placed equally partially in series in multiple common series output locations, such that, for example, each cell has ¼ of its output or otherwise applied characteristics placed in a first series position, each cell has ¼ of its output or otherwise applied characteristics placed in a second series position, each cell has ¼ of its output or otherwise applied characteristics placed in a third series position, and each cell has its output or otherwise applied characteristics placed in a fourth series position. Switchable sections of each cell, or a partial bypass conductor, may be used to assist in so dividing the output or otherwise applied characteristics of each cell. In addition, or instead, the control system may periodically switch series locations of each cell, while keeping them in series, to better balance the load, stresses and other conditions of each cell, aiding in maintaining a balance in their qualities.

All of the embodiments discussed in this application are intended to exemplify and to enhance the understanding of aspects of the invention, and are not exhaustive of the practically infinite additional embodiments falling within the scope of the invention. In some additional embodiments, a heat or other stress redistribution system may be used to reduce or otherwise alter the heat or other stress placed on deteriorated or lagging cells and/or healthier cells, in comparison to one another. For example, a resistor (or resistors) may be used by a control system to assist in balancing charge between several cells, by reducing the level of charge in cells that with too high a state-of-charge (S.O.C.), relative to other cells, bringing them into balance and, in so doing, may cool lower cells, or create or maintain resistive heat energy release at the higher S.O.C. cells. Other embodiments may also include a wide variety of additional electronic components known in the art for controlling, modifying and augmenting power and other electronic characteristics of a circuit and its components. For example, in some embodiments, a control-system controlled amplifier (or amplifiers) may be used to increase the strength of signals or other output, either in a central location, switchably engageable with any cell or other component, or resident on or within a cell, cells or other components. Some embodiments may include cell-to-cell, or cell group-to cell group charging methods, in addition to the methods discussed above. In other embodiments, an auxiliary power source, such as 1715 may have at least some of its characteristics transformed and/or placed at the point of a low or lagging battery cell, or in the same order selected for a low or lagging battery cell, to more correctly replace the lost characteristics of that low or lagging battery cell—rather than place such characteristics in another point on the circuit. In some embodiments, even a low or lagging cell remains partially contributing its characteristics, to fully contribute all available characteristics to the circuit (within safe, or cell health-optimizing limits). In some embodiments, healthier cells may be kept more active than lower cells (for example, transformed and delivering a greater share of the total voltage or power, than other cells, to wear those cells out more greatly, and better match the conditions of each cell in subsequent cycles. It is within the scope of this invention that, over time, some cells in available to the control system will become so low, deteriorated or damaged that they require complete bypass, while other cells remain healthy and charged enough to continue supplying the circuit. In such instances, the control system may so completely bypass such low, deteriorated or damaged cells and replace their entirely absent contribution with electrical power, capabilities or characteristics alteration hardware. By the methods and systems set forth in this application, non-standard entirely different cell types may also be interposed into a circuit, and may be connected or selectably connected and have its characteristics altered and applied to the circuit to fill gaps toward a characteristics level needed by the circuit or load or initially or ideally present with a certain number and arrangement of other cells, or a nominal, standard or expected level for the circuit, or bypassed, or partially bypassed, or used only to charge any other cells or power sources. Similarly, such a system may be used to convert or otherwise alter characteristics from an external charging power source, by first determining, and then so applying, its characteristics to charge any chargeable cell (if determined by the system to benefit from, and be safely able to accept, such charging). Cell or other power source identification signals or standard, nominal and/or starting readings of cells and power sources may aid the system in determining useful electrical characteristics goals in gap-filling and alteration and conversion settings and actions needed to achieve a correct output for a circuit. Although wired circuit hardware, architectures and topologies have been set forth in the present invention, it is within the scope of this invention that ambient electrical characteristics transmission, such as targeted radiation beams and receivers for transferring energy (which also may be used for signal transmission), and inductive transfer of electrical characteristics, by wireless targeting and transfer methods, may be used instead of, or in addition to, any bus, wire or other physical conductor. Similarly, although switching hardware with on and off settings have been predominantly used in the embodiments set forth above, it is within the scope of the invention that hardware implementing variable degrees of conduction between switched circuit components may also, or alternatively, be used to accomplish most switching operations indicated above, as degrees of switching. Similarly, wherever transforming or other converting hardware is used above, it should be understood that switching at least some power sources, cells or sections thereof from parallel to series configurations to variable degrees, and vice versa, may fall within the scope of such disclosures. Where selectable, activatable sections of electrolyte and electrode materials are disclosed above, it should also be understood that any other device creating a different, selected reaction area or volume of or effective fraction of reaction of electrolyte and/or electrode material, or the components thereof, may also, or additionally, be used. For example, in some embodiments, a selectable degree of electrolyte, or electrolyte components, may be injected, chemically released or activated, or otherwise introduced by a control system to change electrical characteristics and/or capabilities of a cell, or section thereof. While the embodiments above have demonstrated the replacement of electrical characteristics and capabilities by various hardware, systems and methods set forth above, in certain series configurations of cells, it should be understood that the gap-filling techniques apply also to addressing lagging circuit contributions from cells in parallel or partially parallel, and partially series configurations, as well. Finally, although gap-filling is carried out between cells with different characteristics and capabilities, it should be understood that characteristics and capabilities of entire modules (groups of cells, in any series, parallel or partially series or partially parallel arrangement) may instead be monitored by the control systems set forth above, and subject to gap-filling based on initial, nominal, expected or otherwise optimal levels. Individual intra-cellular pairings, or sections of electrolyte and electrodes may also be so monitored and subjected to gap-filling from auxiliary cells and other power sources.

Figure 18:
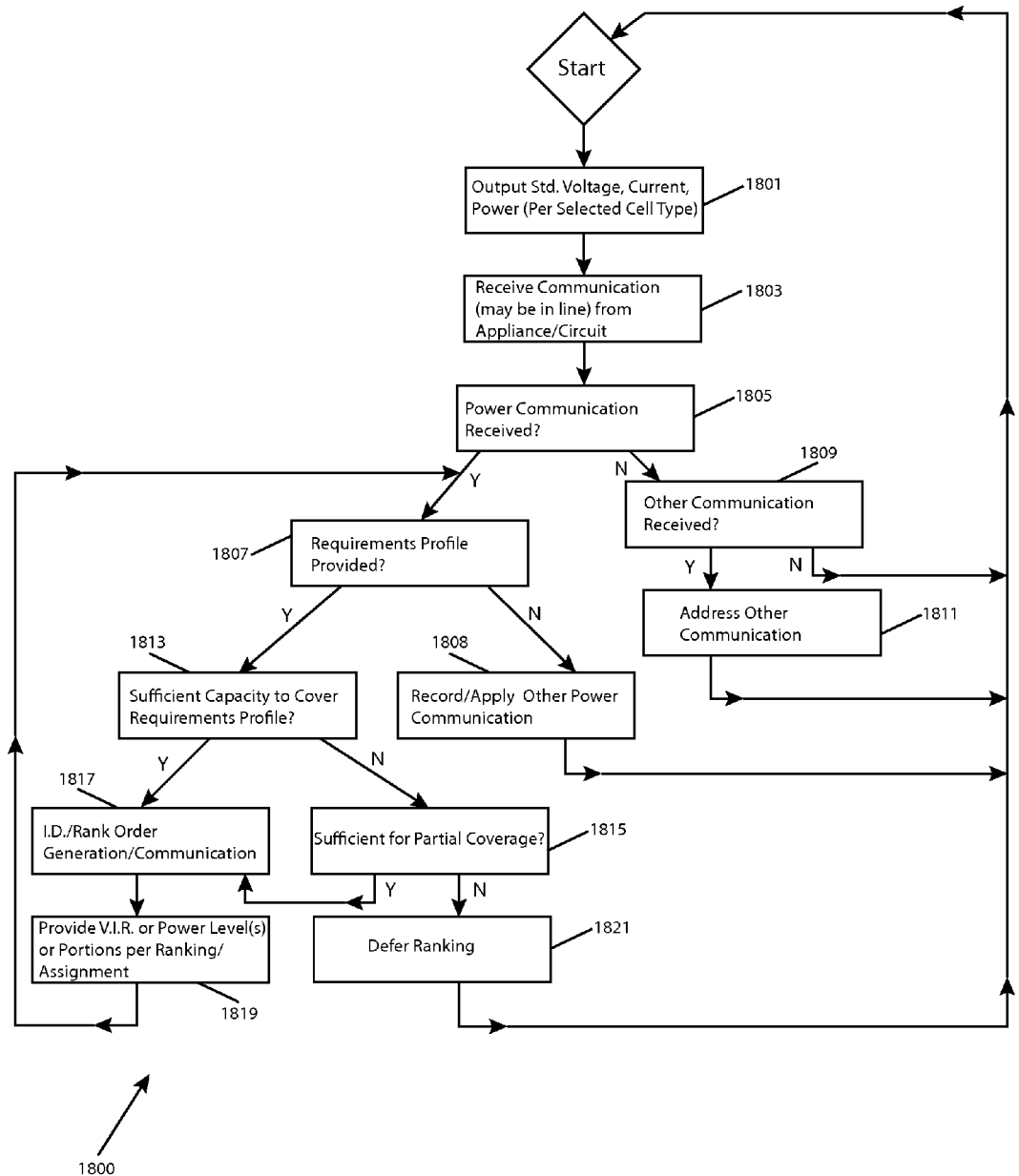
FIG. 18 is an exemplary process flow diagram of exemplary steps that may be taken by a power management control system, such as the hardware and software control system discussed with reference to FIG. 13.

FIG. 18 is an exemplary process flow diagram of exemplary steps 1800 that may be taken by a power management control system, such as the hardware and software control system discussed with reference to FIG. 13. In some embodiments, the power management system implementing exemplary steps 1800 may reside within a battery housing of a predetermined, required or standard size, such as an American National Standard Institute size battery—along with other battery components. In other embodiments, the control system carrying out steps 1800 may at least partially be incorporated in a common circuit with a battery or batteries, or another power source. In any event, preferably, the control system carrying out steps 1800 comprises, or is in communication with, sensory hardware or an intermediate control system capable of measuring the capacity and other electrical characteristics and capabilities of the power source. In addition, and as will be explained in greater detail below, the control system preferably comprises, or is in communication with, sensory hardware or an intermediate control system capable of determining a Requirements Profile of an appliance, circuit or other recipient of energy from the power source. A Requirements Profile is defined below, and elsewhere in this application. The control system is also able to control the output of power, current, voltage, delivery characteristics, transmission media and other electrical characteristics and capabilities of the power source via power control hardware, such as voltage or other electrical characteristics output regulator or other conditioner.

At step 1801, the control system begins by controlling the battery or other power source power output, creating and outputting a standard voltage, current, power and/or other electrical characteristics or capabilities (or patterns thereof, which may vary over time) to an electrical circuit. In practice, such standard characteristics and capabilities may be governmentally or industrially implemented, by specifications in regulations, agreements and product and application specifications. Some such standards may depend on a type of power source, such as a standard for interchangeable batteries. For example, a nominal, average or other expected voltage from an American National Standard Institute standard size cell (such as size AAA, AA, C and D) may dictate the standard electrical characteristics and capabilities provided in step 1801. In some embodiments, the standards and patterns thereof provided in step 1801 may be variably selected by the control system or a user, and may be based on the needs of a particular product or application. The control system then proceeds to step 1803, in which it receives any communications or indications relevant to the circuit, including, but not limited to communications or indications from an appliance or other load held in a common circuit with the power source. The control system then proceeds to step 1805, in which it determines whether it has received a communication or indication related to powering the circuit or any aspect thereof. If so, the control system proceeds to step 1807. If not, the control system may proceed to steps 1809 and 1811, and determines the nature and addresses the communication. For example, the circuit may be reporting information related to servicing or product identification information, or a command unrelated to power control, which may be recorded or otherwise addressed by the control system.

In step 1807, the control system determines whether a Requirements Profile has been provided for the circuit or an aspect of the circuit from the power-related communications and indications received in step 1805. If not, the control system proceeds to step 1808, in which it records or otherwise addresses those power-related communications or indications (other than a Requirements Profile), and returns to the starting position. The Requirements Profile, if provided to or ascertained by the control system, may comprise any information communicated or other indication of the power supply needs of the circuit, or a particular load or aspect of a circuit (such as an appliance). Such communications or indications as set forth in these steps may be provided by communications hardware of an appliance (such as wireless communications hardware) and may be encrypted and may uniquely identify the load aspect with the power supply needs communicated. But, in some embodiments, the communication or indication may be provided via the same media and hardware carrying out power transmission or other aspects of the electrical circuit, to improve design efficiency. For example, load characteristics may be ascertained by the control system by testing the circuit, or monitoring the draw of electrical characteristics from the power source. In some embodiments, any of steps 1801, 1803 and 1805 may be carried out in a different order, or simultaneously, by the control system. In some embodiments, the Requirements Profile may comprise future needs of an aspect of the circuit (or the circuit overall) ascertained, predicted or evaluated, based on current trends in power, current, resistance and voltage drawn or requested by an aspect of the circuit supplied with power by the power supply. Such future needs may also be determined, in whole or in part, by standard needs for an aspect of the circuit under particular usage conditions, which the control system, or an external aspect, may determined to be present. If a Requirements Profile has been ascertained, in step 1807, the control system may proceed to step 1813, in which it determines whether the power source (such as a battery or set of batteries) has sufficient capacity or other electrical characteristics and capabilities to supply the power and other characteristics necessary to meet the Requirements Profile. If not, the control system proceeds to step 1815, in which it determines whether the power source has sufficient characteristics or capabilities to partially meet the Requirements Profile. If so, or if the power source has sufficient characteristics and capabilities to entirely meet the requirements profile, the control system proceeds to step 1817, in which it further communicates its characteristics and capabilities as they relate to the Requirements Profile to other power sources, if any, or to other aspects of the circuit or other control systems. In response, other power sources and control systems may similarly report the characteristics and capabilities of other power sources, and a determination or agreement regarding characteristics and capabilities to be supplied by each power source, optimizing overall performance of all power sources supplying the subject circuit or circuit aspect, may be reached by the control system(s). To implement the optimized provision of characteristics and capabilities from each power source, the control system may identify (or agree to identification with other control systems) each power source or aspect, and, in some embodiments, create a ranking or proportionate share as to what characteristics and capabilities are to be supplied to the circuit or circuit aspect. In some embodiments, such ranking or share may be proposed by the control system and shared for agreement with external actors (such as other control systems, and a tie-breaking or arbitrating control system), or, instead, may dictated by the control system carrying out steps 1800. The control system then proceeds to provide electrical characteristics or capabilities in accordance with the ranking or share determined in step 1817, in step 1819. If the control system determines that the power source has insufficient characteristics and capabilities even to partially meet the Requirements Profile, the control system may defer to other power sources or remove the power source from the circuit, in step 1821. For example, if attempting even to partially supply the circuit or circuit aspect according to the Requirements Profile might create a dangerous or other critical condition, causing permanent damage to an aspect of the circuit, the control system may so defer or isolate the power source.

Figure 19:
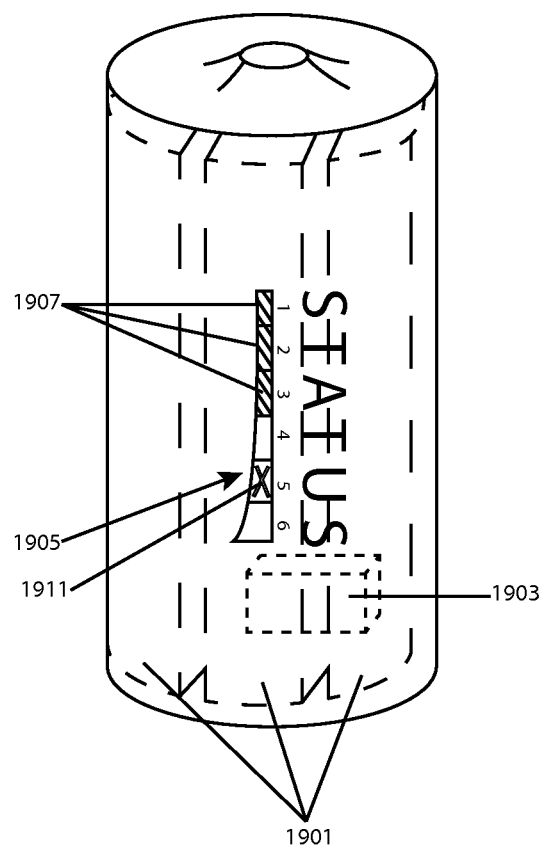
FIG. 19 is a perspective view of an exemplary specialized battery comprising multiple separately connectable and engageable internal sections of cathode and anode material.

FIG. 19 depicts an exemplary specialized battery 1900 comprising multiple separately connectable or engageable internal sections 1901 of cathode and anode material. Battery 1900 may comprise a control unit 1903, which may further comprise at least part of a control system, such as the control system set forth with reference to FIG. 13, above. Control system 1903 controls variable electrical connection hardware or partitioning hardware (not pictured). As a result, control system 1903 may activate and electrically connect (or isolate) any of sections 1901, and place them in any parallel, series, or other order with any other sections 1901, or power source in a common circuit with battery 1900, according to the methods set forth elsewhere in this application in relation to control systems and related hardware. Control system 1903 also comprises or controls sensors or other assessment hardware, through which it is able to assess electrical characteristics or capabilities, or conditions, in any of sections 1901 or in an electrical circuit of which battery 1900 is a part.

Control system 1903 also may comprise and control status display indicators, such as those pictured in variable battery display 1905, which may indicate the activation, engagement and statuses of sections 1901, and battery 1900 overall. For example, if there are six sections 1901, and three sections retain sufficient capacity, characteristics or other capabilities required for providing power to a circuit (such as providing a standard amount of power or another characteristic, or characteristics to fulfill the Requirements Profile of a load, appliance or other aspect of a circuit) display 1905 may be shaded in three sections 1907 corresponding, which correspond with those three sections, as pictured. Another three sections, 1909, by contrast, may be unshaded to signify to a user that they have been depleted of electrical characteristics and capabilities, and/or have been deactivated and isolated from supplying power to the circuit of which battery 1900 is a part. Another indication 1911, may also indicate if a section is damaged or otherwise incapable of being engaged to supply power to the circuit, even if battery 1900 is recharged. Generally, however, if their corresponding sections are recharged or otherwise restored to a condition in which they have sufficient capabilities or characteristics required to power the circuit, each of the sections of display 1905 will again each become shaded to signify that capability.

In a preferred embodiment, control unit 1903 activates and connects a single section 1901 for initial output from battery 1900 (while disengaging and electrically isolating other sections 1901), and proceeds to use that section to output power until it is depleted to a point that its performance will no longer meet a required standard for supplying a circuit (such as a voltage, current, or power output standard for a battery type that battery 1900 comports with). Following that, the control system disengages that section, isolating it from the circuit of which battery 1900 is a part, and activates and connects another section 1901 with greater electrical capabilities or characteristics, until that section is then depleted to the same degree, and proceeds until each section 1901 is depleted. After a section 1901 is disengaged, in this process, its electrical characteristics and capabilities may rebound during rest. If the control system determines that such a rebound has occurred to a degree where a section is no longer depleted to a point that its performance will not meet the required standard, the control system may again activate and engage that section. But, in other embodiments, more than one cell may be engaged simultaneously, and display 1905 may indicate a different partitioning, or an overall capacity and charge level of battery 1900.

In other embodiments, the control system may, according to other aspects set forth in the present application, assess electrical characteristics gaps, both internally and externally from battery 1900, and create gap-filling electrical characteristics. In still other embodiments, the control system of battery cell 1900 may assess and fulfill a predicted Requirements Profile of a present or anticipated load, or engage additional, reaction controlling hardware (such as internal chemical reaction interface controlling hardware within an anode, cathode or electrolyte.

Figure 20:
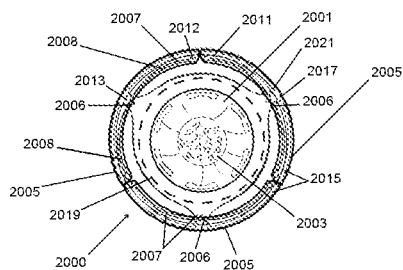
FIG. 20 is a front view of an exemplary expandable, rechargeable battery, with multiple-format compliance capability.

FIG. 20 is a front view of an exemplary expandable, rechargeable battery 2000, with multiple-format compliance capability. Battery 2000 is generally cylindrical in shape, and when viewed from the top, as in FIG. 20, has a generally circular shape (as pictured). Battery 2000 comprises a central core 2001, which is an enclosed volume containing battery components, such as anode material, cathode material, separator material, electrolyte, and contacts, such as exemplary positive terminal contact 2003. However, battery 2000 also comprises outer form factor components that are physically expandable and compressible to suit different applications, some of which applications may be for a variety of standard battery sizes and other characteristics. For example, in the configuration pictured in FIG. 20, outer push heads 2005 are in an inwardly-compressed configuration, yielding a relatively small diameter form factor for battery 2000, approximately corresponding with the diameter and shape of an American National Standard Institute size AA battery.

Push heads 2005 hold the pictured, inwardly-compressed position through a combination of physical aspects and related structures. First, in the inwardly-compressed position pictured, push heads 2005 abut one another, providing opposing structural forces to one another that aid in maintaining their position, and providing outward force against the walls of a battery installation compartment, if battery 2000 is installed in such an installation compartment of an appliance. In addition, push heads 2005 comprise, in their outer surfaces (and, in some embodiments, elsewhere), an elastomeric or otherwise gripping material, aiding in preventing slippage of push heads 2005 against one another and against the walls of a battery compartment. Push heads 2005 are also preferably slidingly engaged with partially inserted flexible spring joists, such as the examples pictured as 2007. Each push head 2005 comprises two inserted spring joist sections, such as the examples shown as 2008, inserted through a central, inward-facing port 2006 of each push head. In the compressed configuration pictured, spring joists 2007 are substantially maximally inserted within push heads 2005 through ports 2006 and, as such, spring joists 2007 extend almost completely into spring joist-hugging interior channels, such as the example shown as 2011, of push heads 2005. A ball or barb, such as the example shown as 2012, at the distal end of each spring joist 2007, prevents (by colliding with a port 2006 and against a dividing stanchion, such as example 2013) the complete escape of spring joists 2007 from ports 2006, the risk of which would otherwise occur in other, less compressed configurations of battery 2000. Spring joists 2007 are preferably comprised of a flexible, force-biased material and, when inserted to any degree within channels 2011, spring joists 2007 are not bent past their elastic range and tend to press themselves outward through ports 2006, due to that force-bias and their elastic properties. Also preferably, channels 2011 are comprised of a flexible material, and further comprise ramping that tends to push balls or barbs 2012 toward ports 2006.

In combination, all of the force biasing and flexible properties discussed above tend to cause battery 2006 to evenly, gradually expand within a battery installation compartment, occupying whatever size compartment is present surrounding battery 2000 and maintaining a central location of core 2001 and contacts at the ends of battery 2000, such as contact 2003, against contacts present in such a battery compartment. An exemplary expanded configuration is shown and discussed in greater detail in reference to FIG. 21. These aspects allow battery 2000 to fill a wide variety of standard size battery compartments, in terms of width. To accommodate differences in length of such standard size battery compartments, a section comprising at least one of the contacts of battery 2000 may also extend to a variety of lengths, for example, with spring loading connecting that section with the remainder of battery 2000. Alternatively, at least one contact 2003 of battery 2000 may itself be flexible and force-biased to extend past a minimum, compressed length, which length corresponds with the shortest standard length that battery 2000 is intended to comply with. Similarly, when maximally extended by force bias, the at least one contact, such as 2003, may correspond with the longest standard length that battery 2000 is intended to comply with. In a preferred embodiment, a control system resident within battery 2000 (which may be the control system discussed with reference to FIG. 13) may be connected with sensor hardware capable of determining the degree to which push heads 2005 and contact 2003 or a section comprising it are extended, and determine if battery 2000 is installed in a particular standard sized battery compartment. From this, the control system may further determine that battery 2000 is intended to be used as a battery type corresponding with that determined size and, accordingly, engage different sections of anode and/cathode material within core 2001, as discussed with reference to FIG. 19, above, and/or place them in different serial and parallel arrangements to create a voltage corresponding with the standard size battery determined to be intended. Alternatively, different reaction profiles and amounts may be used, and power conversion, transformation or exporting techniques discussed elsewhere in this application may be used by the control system, with the hardware required for those techniques comprised in battery 2000, to achieve the electrical characteristics and capabilities of the intended battery type.

Biased wall-building, bridging joists, such as the example shown as 2015, also may be incorporated in battery 2000, to aid in maintaining the expanded or compressed round or cylindrical positions of push-heads 2005. As with spring joists 2007, bridging joists 2015 comprise ending balls or barbs 2021 to prevent their total escape, and are at least partially inserted into and slidingly engaged with channels (in this instance, channels such as the example shown as 2017) on the interior of push-heads 2005. As with channels 2011, channels 2017 are preferably semi-flexible and ramped, creating a bias toward extruding and pushing out joists 2015, further aiding in causing a general, uniform expansion of push heads 2005 to fill the cavity of a battery compartment, while maintaining a cylindrical or circular profile of battery 2000. This type of uniform expansion, and some of the standard sizes that may be occupied by the expansion, may be better understood with reference to FIG. 21, below, depicting a semi-expanded configuration of battery 2000.

In an alternative embodiment, rather than have a central battery core 2001, the remaining aspects of battery 2001, including a flexibly extending electrical contact and control unit and its attendant hardware, may be configured to receive a standard size battery along a cut-out cylindrical cavity (shown by dashed line 2019). In this embodiment, a user may insert a standard (e.g., an American National Standard Institute size AAA battery) in cavity 2019, allowing it to be adapted for use in a wide variety of different-sized applications.

Figure 21:
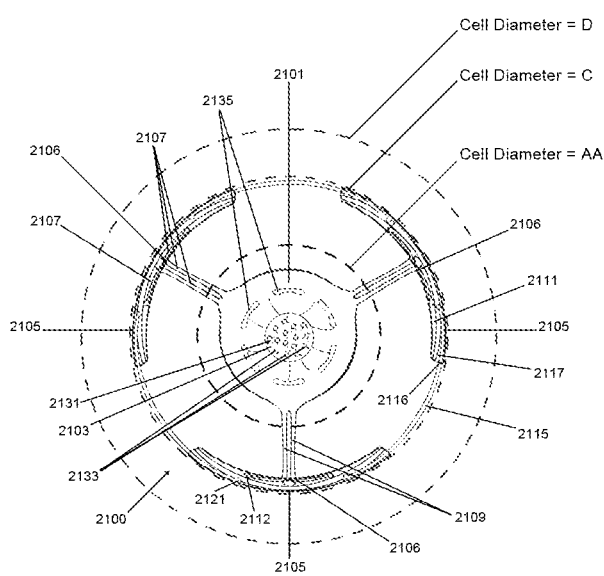
FIG. 21 is a front view of the same exemplary expandable, rechargeable battery, with multiple-format compliance capability as pictured in FIG. 20, but in a more expanded physical configuration.

FIG. 21 is a front view of the same exemplary expandable, rechargeable battery, with multiple-format compliance capability as pictured in FIG. 20 (now 2100), but in a more expanded physical configuration. The push heads (now 2105) have now been pushed further away from the central core (now 2101) creating a larger diameter outer profile for battery 2100. More specifically, the profile created now has a diameter substantially compliant with the diameter and shape of an American National Standard Institute size C battery, which is substantially larger than that occupied by battery 2100 when in a more compressed configuration. As discussed above, a combination of force-biased, flexible structural pieces have contributed to causing and maintaining this expansion. For example, the inserted spring joist sections 2008 within push heads 2105 have partly been expelled from the central ports (now 2106) of push heads 2105. Again, this is due to both the flexible, rebounding spring structure of the flexible spring joists (such as the examples now shown as 2107) that are closer to a resting conformation when more parallel one another, as shown by exemplary parallel sections 2109, but also due to the squeezing force of ramped walls of the interior channels (as in the examples now shown as 2111 and 2117) that tend to squeeze and push spring joists 2107 and the bridging joists (now exemplified as 2115) from push heads 2105 through side ports, as exemplified by 2116. In the partially expelled positions shown, joists such as 2107 and 2115 have permitted the inner surfaces of channels 2111 and 2117 to push outward from the center of each push-head 2105, in the process of expelling the joists.

As discussed above, battery 2000/2100 will naturally tend to occupy the space of a battery compartment in which it is placed to the same degree as a battery cell of the type that the compartment is designed to accommodate. In addition, however, to aid battery 2100 in achieving a standard or otherwise desirable profile and configuration, ridges or other positive stops (not pictured) may be incorporated within channels 2111 and 2117 to encourage or reversibly hold the joist balls (now exemplified by 2112 and 2121, at the ends of the joists) in a position corresponding with the standard or desired profile created by push heads 2105.

After removing battery 2100 from a battery compartment, push heads 2105 will gradually tend to expand further, until a maximum desired profile is achieved—such as the size and profile of an American National Standard Institute size D battery, as demonstrated by the outer-most dashed circumference line in the figure.

To aid battery 2000/2100 in establishing electrical connection between its contacts, such as positive terminal 2003 (now shown as 2103)—especially in the context of a linearly extendable and compressible contact, to accommodate different length compartments—a gripping texture 2131 may be included, preferably with extending pointed or edged ridges 2133. As an added benefit, the resulting points of contact may aid in penetrating and, especially with a burning electrical current which is resultantly focused on a point of contact, destroying grease or other soil barriers impeding optimal electrical current. To further aid in establishing contact where some degree of drift may occur with battery expansion, additional periphery contacts, such as the examples shown as 2135, may also be included, even with a positive contact (as pictured), while still maintaining the general profile and visual cue of the type of contact that it is, due to the small, circular central contact area.

After using battery 2000/2100 in a particular appliance, a user may rapidly and intuitively return it to a smaller conformation, if desired, by providing substantially even inward pressure on push heads 2005/2105. It should be understood that, although the expanding inserted and extruded structures set forth in this application are preferred, they are not exhaustive of the many different approaches to providing a multiple-format compliant battery. For example, a malleable, expanding matrix (such as a compressible foam) may be used to surround battery core 2001/2101, or multiple fixed jackets with various battery size profiles that may be interchanged may also, or alternatively, be used. The particular embodiments set forth in this application are exemplary only, and not exhaustive of the innumerable alternative embodiments for carrying out aspects of the present invention.

I claim:

1. A power output device comprising:
   power storage hardware with a plurality of power delivery subcomponents,
   hardware configured to control energetic activity within said power delivery subcomponents, as directed by a control system,
   said control system being connected to said plurality of power delivery subcomponents, and being configured to perform operations to:
   (1) determine an energetic activity of said power delivery subcomponents to deliver a first power output to be supplied by said power output device to a load, and
   (2) create said energetic activity within said power delivery subcomponents, by controlling said hardware configured to control energetic activity within said power delivery subcomponents,
   wherein said power output device comprises a core comprising power storage components; and
   wherein said power output device comprises a housing with an expandable and compressible outer profile, configured to expand until occupying a storage compartment in which said power output device is placed.

2. The power output device of claim 1, wherein said control system creates power based on a level of expansion or compression of said housing.

3. The power output device of claim 2, wherein said control system creates power matching a standard battery format, based on a level of expansion or compression of said housing corresponding with a standard battery format.

4. A power output device comprising:
   power storage hardware comprising a plurality of power delivery subcomponents,
   hardware configured to control energetic activity within said power delivery subcomponents by creating new channels for power transmission, as directed by a control system,
   said control system being connected to said plurality of power delivery subcomponents, and being configured to perform operations to:
   control said energetic activity within said power delivery subcomponents by controlling said hardware configured to control energetic activity within said power delivery subcomponents,
   wherein said power transmission is light or other photons and wherein said control system is configured to send power through said subcomponents at different angles within said subcomponents, leading to different storage times within said subcomponents.

5. The power output device of claim 4, wherein said control system is configured to perform operations to change at least one characteristic of power with at least one of said subcomponents based at least on a result of an assessment of at least one operational condition of said power output device.

6. The power output device of claim 4, wherein said control system is configured to switch electromagnetic radiation between different propagation routes through different optical components.

7. The power output device of claim 6, wherein said different propagation routes differ from one another by the length of time in which electromagnetic radiation is transmitted and stored.

8. The power output device of claim 6, wherein said different propagation routes differ from one another by the order in which electromagnetic radiation is transmitted and stored within them.

9. The power output device of claim 6, wherein said device is configured to select a total route comprised of at least one of said different propagation routes to deliver power at a point in time.

10. The power output device of claim 6, wherein said device is configured to select a total route comprised of at least one of said different propagation routes to deliver a particular level of power, among a plurality of possible levels of power.

11. A method, comprising:
controlling power output with power storage hardware comprising a plurality of power delivery subcomponents;
controlling energetic activity within said power delivery subcomponents by creating new channels for power transmission using a control system, thereby creating a power output level selected by a user and/or said control system; and
sending power through said subcomponents at different angles within said subcomponents, leading to different storage times within said subcomponents.

12. The method according to claim 11, comprising the following additional step:
reassessing said power output level selected by a user and/or system and, based on said reassessing, selecting a second power output level.

13. The method according to claim 11, comprising the following additional step: changing a level of at least one characteristic of at least one of said power delivery subcomponents based at least on a result of an assessment of at least one operational condition of at least one other of said power delivery subcomponents.

14. The method according to claim 11, comprising the following additional step:
said power output device is a battery comprising at least one battery cell and said control system is configured to perform operations to electrically connect one of a plurality of separate anode portions of said battery cell to a circuit.

15. The method according to claim 11, comprising the following additional step:
said control system is configured to switch electromagnetic radiation between different propagation routes through different optical components.

16. The method according to claim 15, comprising the following additional step:
said different propagation routes are configured to differ from one another by the length of time in which electromagnetic radiation is transmitted and stored.

17. The method according to claim 15, comprising the following additional step:
said different propagation routes are configured to differ from one another by the order in which electromagnetic radiation is transmitted and stored within them.

18. The method according to claim 15, comprising the following additional step:
selecting a total route comprised of at least one of said different propagation routes to deliver power at a point in time.

19. The method according to claim 15, comprising the following additional step:
selecting a total route comprised of at least one of said different propagation routes to deliver a particular level of power, among a plurality of possible levels of power.

* * * * *